United States Patent
Grant et al.

(10) Patent No.: US 12,501,320 B2
(45) Date of Patent: Dec. 16, 2025

(54) FREQUENCY DOMAIN RESOURCE ALLOCATION FOR INTERLACED TRANSMISSION

(71) Applicant: Telefonaktiebolaget LM Ericsson (publ), Stockholm (SE)

(72) Inventors: Stephen Grant, Pleasanton, CA (US); Jung-Fu Cheng, Fremont, CA (US); Tai Do, Lund (SE); Reem Karaki, Aachen (DE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 366 days.

(21) Appl. No.: 17/624,184

(22) PCT Filed: Jul. 1, 2020

(86) PCT No.: PCT/IB2020/056231
§ 371 (c)(1),
(2) Date: Dec. 30, 2021

(87) PCT Pub. No.: WO2021/001770
PCT Pub. Date: Jan. 7, 2021

(65) Prior Publication Data
US 2022/0377619 A1 Nov. 24, 2022

Related U.S. Application Data

(60) Provisional application No. 62/888,188, filed on Aug. 16, 2019, provisional application No. 62/870,434, filed on Jul. 3, 2019.

(51) Int. Cl.
*H04W 28/26* (2009.01)
*H04L 5/00* (2006.01)
(Continued)

(52) U.S. Cl.
CPC .......... *H04W 28/26* (2013.01); *H04L 5/0044* (2013.01); *H04L 5/0092* (2013.01);
(Continued)

(58) Field of Classification Search
CPC . H04W 28/26; H04W 72/0453; H04W 72/23; H04W 80/02; H04L 5/0044; H04L 5/0092; H04L 5/0094; H04L 5/0041
See application file for complete search history.

(56) References Cited

U.S. PATENT DOCUMENTS

| | | |
|---|---|---|
| 2011/0040556 A1 | 2/2011 | Moon et al. |
| 2015/0131546 A1 | 5/2015 | Seo et al. |

(Continued)

FOREIGN PATENT DOCUMENTS

| | | |
|---|---|---|
| CN | 108366424 A | 8/2018 |
| CN | 108886452 A | 11/2018 |

(Continued)

OTHER PUBLICATIONS

Notice of Reasons for Rejection for Japanese Patent Application No. 2021-539404, mailed Oct. 4, 2022, 11 pages.

(Continued)

*Primary Examiner* — Christopher M Crutchfield
(74) *Attorney, Agent, or Firm* — Withrow & Terranova, PLLC

(57) ABSTRACT

Systems and methods are disclosed herein that relate to frequency domain resource allocation for interlaced transmission. Embodiments of a method performed by a wireless device are disclosed. In one embodiment, a method performed by a wireless device comprises receiving a reserved resource indicator that indicates an uplink reserved resource pattern. The uplink reserved resource pattern defines at least which subset of uplink Physical Resource Blocks (PRBs) from among a set of allocated uplink PRBs are not available (Continued)

for uplink transmission. In this manner, a low overhead, flexible frequency domain resource allocation scheme for partial interlace transmission is provided.

17 Claims, 21 Drawing Sheets

(51) Int. Cl.
    *H04W 72/0453*     (2023.01)
    *H04W 72/23*     (2023.01)
    *H04W 80/02*     (2009.01)

(52) U.S. Cl.
    CPC ....... *H04W 72/0453* (2013.01); *H04W 72/23* (2023.01); *H04W 80/02* (2013.01)

(56) References Cited

U.S. PATENT DOCUMENTS

| | | | |
|---|---|---|---|
| 2016/0330004 | A1 | 11/2016 | Kim et al. |
| 2017/0280476 | A1 | 9/2017 | Yerramalli et al. |
| 2018/0124790 | A1 | 5/2018 | Yerramalli |
| 2018/0146480 | A1 | 5/2018 | Chendamarai Kannan et al. |
| 2018/0234863 | A1 | 8/2018 | Li et al. |
| 2019/0124678 | A1 | 4/2019 | Harada et al. |
| 2019/0150170 | A1 | 5/2019 | Park et al. |
| 2019/0334680 | A1 | 10/2019 | Li et al. |
| 2019/0349178 | A1 | 11/2019 | Jia et al. |
| 2020/0351668 | A1* | 11/2020 | Kundu .................. H04L 5/0092 |
| 2021/0314938 | A1* | 10/2021 | Kim ........................ H04L 5/001 |
| 2021/0368507 | A1 | 11/2021 | Kuang et al. |
| 2022/0022256 | A1* | 1/2022 | Li ........................... H04L 5/001 |
| 2022/0104226 | A1* | 3/2022 | Hu ........................ H04W 72/23 |
| 2022/0131666 | A1* | 4/2022 | Iwai ...................... H04L 5/0007 |
| 2022/0377791 | A1* | 11/2022 | Nogami ............. H04W 74/006 |

FOREIGN PATENT DOCUMENTS

| | | | |
|---|---|---|---|
| CN | 109156001 | A | 1/2019 |
| CN | 111278127 | A * | 3/2019 |
| CN | 109792774 | A | 5/2019 |
| EP | 3634055 | A1 | 4/2020 |
| GB | 2548922 | A | 10/2017 |
| JP | 2017184202 | A | 10/2017 |
| WO | 2018031066 | A1 | 2/2018 |
| WO | 2020144168 | A1 | 7/2020 |

OTHER PUBLICATIONS

Decision to Grant for Japanese Patent Application No. 2021-539404, mailed Apr. 18, 2023, 5 pages.
First Office Action for Chinese Patent Application No. 202080008567.7, mailed Nov. 18, 2023, 21 pages.
Non-Final Office Action for U.S. Appl. No. 17/422,179, mailed Oct. 5, 2023, 9 pages.
Author Unknown, "Technical Specification Group Radio Access Network; Evolved Universal Terrestrial Radio Access (E-UTRA); Base Station (BS) radio transmission and reception (Release 16)," Technical Specification 36.104, Version 16.2.0, Jun. 2019, 3GPP Organizational Partners, 265 pages.
Author Unknown, "Technical Specification Group Radio Access Network; NR; Multiplexing and channel coding (Release 15)," Technical Specification 38.212, Version 15.6.0, Jun. 2019, 3GPP Organizational Partners, 101 pages.
Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.
Author Unknown, "3rd Generation Partnership Project; Technical Specification Group Radio Access Network; NR; Physical layer procedures for data (Release 15)," 3GPP TS 38.214 V15.3.0, Sep. 2018, 3GPP Organizational Partners, 96 pages.
Author Unknown, "Technical Specification Group Radio Access Network; NR; Physical layer procedures for data (Release 15)," Technical Specification 38.214, Version 15.6.0, Jun. 2019, 3GPP Organizational Partners, 105 pages.
Author Unknown, "Technical Specification Group Radio Access Network; Study on NR-based access to unlicensed spectrum (Release 16)," Technical Specification 38.889, Version 16.0.0, Dec. 2018, 3GPP Organizational Partners, 119 pages.
Author Unknown, "5GHz RLAN; Harmonised Standard covering the essential requirements of article 3.2 of Directive 2014/53/EU," EN 301 893, Version 2.1.1, May 2017, ETSI, 122 pages.
Ericsson, "R1-1909297: UL signals and channels for NR-U," 3GPP TSG-RAN WG1 Meeting #98, Aug. 26-30, 2019, Prague, Czech Republic, 18 pages.
Ericsson, "R1-1909303: Evaluation results for enhanced PUCCH and PRACH designs," 3GPP TSG-RAN WG1 Meeting #98, Aug. 26-30, 2019, Prague, Czech Republic, 25 pages.
Nokia et al., "R1-1812660: On uplink signal and channel structures for NR-U," 3GPP TSG RAN WG1 Meeting #95, Nov. 12-16, 2018, Spokane, USA, 18 pages.
Nokia, et al., "R1-1902108: NR-U enhancements for uplink signals and channels," 3GPP TSG RAN WG1 Meeting #96, Feb. 25-Mar. 1, 2019, Athens, Greece, 10 pages.
Qualcomm Inc., "RP-182878: New WID on NR-based Access to Unlicensed Spectrum," 3GPP TSG RAN Meeting #82, Dec. 10-13, 2018, Sorrento, Italy, 8 pages.
Qualcomm, "RP-191581: Guidance on essential functionality for NR-U," 3GPP TSG RAN meeting #84, Jun. 3-6, 2019, Newport Beach, California, 8 pages.
International Search Report and Written Opinion for International Patent Application No. PCT/EP2020/050192, mailed Mar. 30, 2020, 9 pages.
International Search Report and Written Opinion for International Patent Application No. PCT/IB2020/056231, mailed Sep. 21, 2020, 13 pages.
Ericsson, "R1-1813463: On Interlace Design for NR-U uplinks," 3GPP TSG-RAN WG1 Meeting #95, Nov. 12-16, 2018, Spokane, Washington, 8 pages.
Nokia, et al., "R1-1904184: NR-U uplink signals and channels," 3GPP TSG RAN WG1 Meeting #96bis, Apr. 8-12, 2019, Xi'an, China, 10 pages.
Vivo, "R1-1812304: Discussion on sub-PRB interlace structure," 3GPP TSG RAN WG1 Meeting #95, Nov. 12-16, 2018, Spokane, Washington, 5 pages.
First Office Action for Chinese Patent Application No. 202080062126.5, mailed Feb. 22, 2025, 24 pages.

* cited by examiner

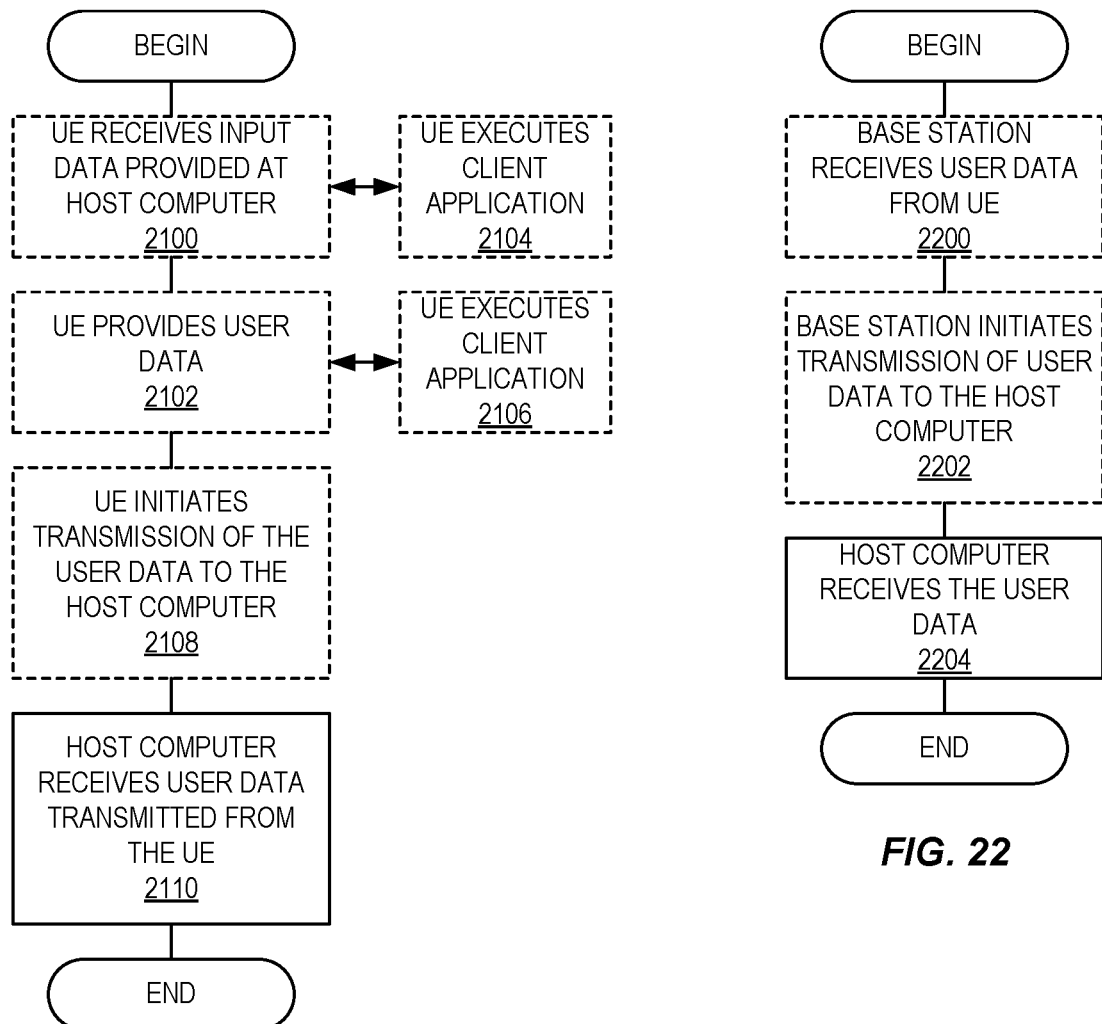

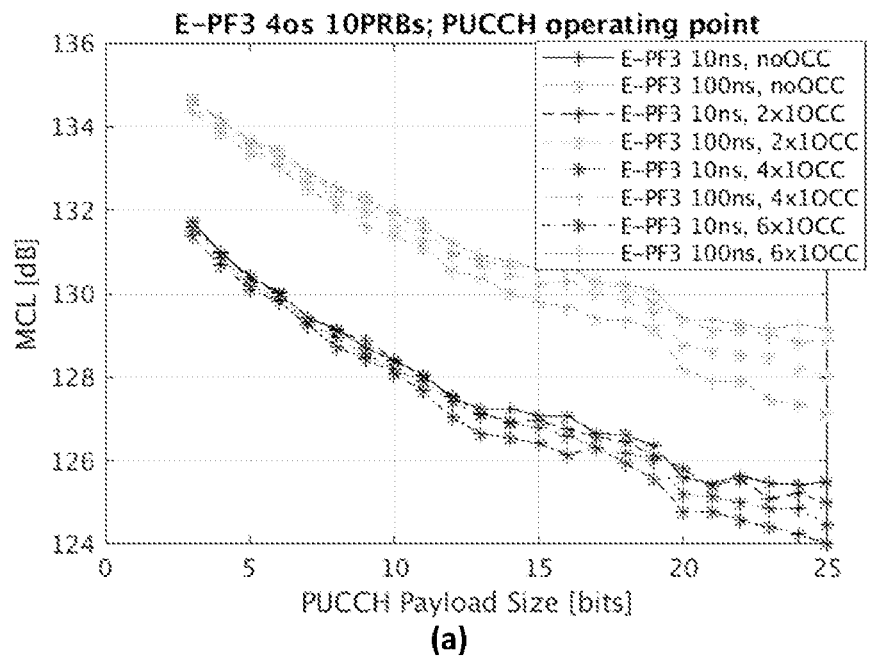
(a)
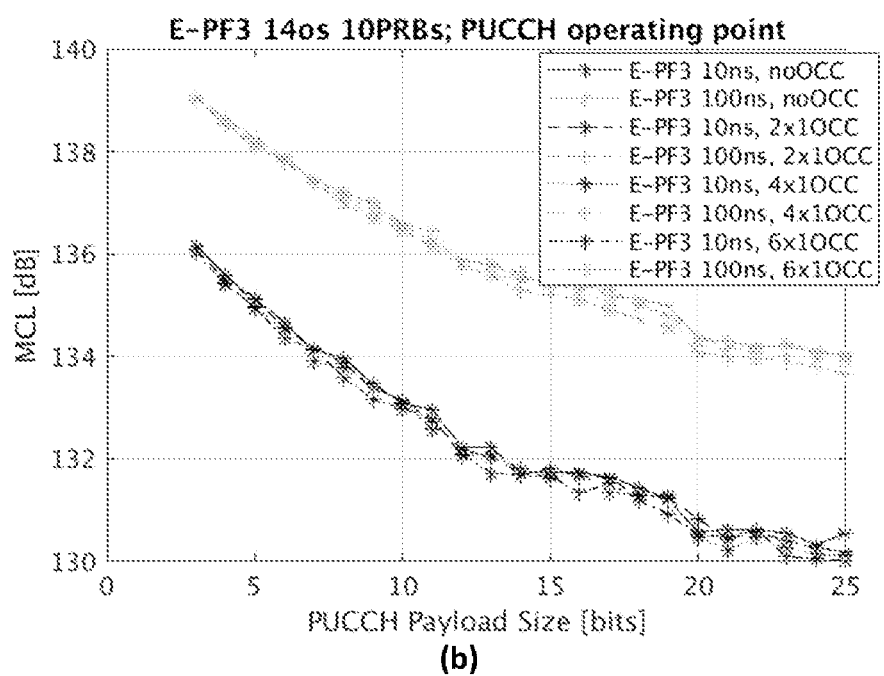
(b)
FIG. 26

FREQUENCY DOMAIN RESOURCE ALLOCATION FOR INTERLACED TRANSMISSION

RELATED APPLICATIONS

This application is a 35 U.S.C. § 371 national phase filing of International Application No. PCT/IB2020/056231, filed Jul. 1, 2020, which claims the benefit of provisional patent application Ser. No. 62/870,434, filed Jul. 3, 2019, and provisional patent application Ser. No. 62/888,188, filed Aug. 16, 2019, the disclosures of which are hereby incorporated herein by reference in their entireties.

TECHNICAL FIELD

The present application relates to a cellular communications system and, in particular, to frequency domain resource allocation in a cellular communications system.

BACKGROUND

Currently, the 5th Generation (5G) of Third Generation Partnership Project (3GPP) cellular system, called New Radio (NR), is being standardized in 3GPP. NR is developed for maximum flexibility to support multiple and substantially different use cases. Besides the typical mobile broadband use case, Machine Type Communication (MTC), Ultra-Low Latency Critical Communications (ULLCC), sidelink Device-to-Device (D2D), and several other use cases are also supported by NR.

In NR, the basic scheduling unit is called a slot. A slot consists of fourteen (14) Orthogonal Frequency Division Multiplexing (OFDM) symbols for the normal cyclic prefix configuration. NR supports many different subcarrier spacing configurations. At a subcarrier spacing of 60 kilohertz (kHz) for example, the OFDM symbol duration is ~16.7 microseconds (µs). As an example, a slot with 14 symbols for the same Subcarrier Spacing (SCS) is 250 µs long (including cyclic prefixes).

NR also supports flexible bandwidth configurations for different User Equipments (UEs) on the same serving cell. In other words, the bandwidth monitored by a UE and used for its control and data channels may be smaller than the carrier bandwidth. One or multiple Bandwidth Part (BWP) configurations for each component carrier can be semi-statically signaled to a UE, where a BWP consists of a group of contiguous Physical Resource Blocks (PRBs). Reserved resources can be configured within the BWP. The bandwidth of a BWP is equal to or is smaller than the maximal bandwidth capability supported by a UE.

Frequency Domain Resource Allocation (RA) in NR

In NR, in order to schedule which frequency resource(s) the UEs use to transmit in the uplink (UL) within a BWP, the NR base station (gNB) typically includes frequency domain RA information bits in the Downlink Control Information (DCI). There are two RA types supported in NR (see, e.g., 3GPP Technical Specification (TS) 38.214 V15.6.0).

Type 0: This RA mechanism is defined by a bitmap of allocated Resource Block Groups (RBGs), where an RBG consists of a number P of contiguous PRBs. P can be 2, 4, 8, or 16, depending on the size (number of PRBs) of the BWP. Hence, the scheduling granularity is per RBG. The use of a bitmap allows for an arbitrary combination of RBGs, either contiguous or non-contiguous, to be allocated. Generally, a larger value of P is configured for larger BWP sizes so as to keep control of the overhead (number of bits) required to signal the RA in DCI. A larger value of P reduces the number of bits required for RA signaling but results in coarser granularity of RA. For example, with 30 kHz SCS, 20 Megahertz (MHz) BWP, and P=4, Type 0 RA requires ceil($N_{RB}/P$)=ceil(51/4)=13 bits for RA signaling, where $N_{RB}$ is the total number of available PRBs in the BWP.

Type 1: In contrast to Type 0, this RA mechanism allows for contiguous frequency allocations only. The set of contiguous PRBs is defined by a starting PRB and a length (number of PRBs). The start and length are encoded into a single value, referred to as Resource Indictor Value (RIV), which is signaled in DCI. With this mechanism, the scheduling granularity is finer than Type 0, i.e. per PRB instead of per RBG, but generally requires fewer bits in DCI compared to Type 1, especially for large BWP sizes. For example, with 30 kHz SCS, 20 MHz BWP, Type 1 RA requires ceil(log 2(NRB*(NRB+1)/2))=11 bits for RA signaling.

NR in Unlicensed Spectrum (NR-U)

In addition to operation in licensed bands, NR is being enhanced in Release 16 (Rel-16) to allow operation in unlicensed bands. Allowing unlicensed networks, i.e., networks that operate in shared spectrum (or unlicensed spectrum) to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators and, ultimately, to the 3GPP industry as a whole. Some features in NR need to be adapted to comply with the special characteristics of the unlicensed band as well as also different regulations. SCSs of 15 or 30 kHz are the most promising candidates for NR-U OFDM numerologies for frequencies below 6 Gigahertz (GHz).

When operating in unlicensed spectrum, many regions in the world require a device to sense the medium as free before transmitting. This operation is often referred to as Listen-Before-Talk (LBT). There are many different flavors of LBT depending on which radio technology the device uses and which type of data it wants to transmit at the moment. Common for all flavors is that the sensing is done in a particular channel (corresponding to a defined carrier frequency) and over a predefined bandwidth. For example, in the 5 GHz band, the sensing is done over the 20 MHz bandwidth.

Many devices are capable of transmitting (and receiving) over a carrier bandwidth that is larger than the bandwidth of a single channel. A device is only allowed to transmit on the channels where the medium is sensed as free. Again, there are different flavors of how the sensing should be done when multiple channels are involved.

Wideband Operation in NR-U

Similar to NR, it is expected that NR-U will support transmissions with wide bandwidth, e.g. up to several hundreds of MHz bandwidth. However, there could be different radio technologies with different device capabilities that simultaneously share the same spectrum, e.g. WiFi. It will be unlikely that a device will sense the channel free over the whole wide bandwidth, especially at high load. Thus, it is beneficial for NR-U to support transmissions with dynamic bandwidth in which the device can decide which part(s) of the supported bandwidth to use based on its LBT outcome.

Two approaches for the device to use in wideband transmissions are the following:
 Mode 1: Carrier Aggregation (CA)-based wideband operation analogous to Long Term Evolution (LTE) enhanced License Assisted Access (eLAA); and
 Mode 2: Single wideband carrier operation based on a single active BWP.

FIG. 1 shows an example of these two modes for an operating bandwidth of 80 MHz. For Mode 1, the UE is configured with four 20 MHz Component carriers (CCs) totaling 80 MHz which are activated prior to reception/transmission. For Mode 2, the UE is configured with a single 80 MHz BWP which is assumed activated prior to reception/transmission. The notion of BWPs is new to NR; LTE did not include BWPs. As shown in the diagram for Mode 2, the wideband carrier (CC) may be greater than 80 MHz; the BWP is simply the part of this wideband carrier for which the UE is configured for downlink (DL) and UL transmission/reception.

As is being discussed in 3GPP now, LBT is performed in units of 20 MHz, at least for Mode 1. In other words, LBT is performed on a per-CC basis. Transmission then occurs on each CC that is sensed as free, i.e. unoccupied by a transmission from another node (same or different Radio Access Technology (RAT)) as determined by an LBT procedure.

For Mode 2, we assume here that LBT is also performed in units of 20 MHz, and we refer to each unit as an "LBT bandwidth piece" or equivalently "LBT sub-band" as shown in FIG. 1. Based on the LBT outcome, the device aggregates resources from each free LBT sub-band within the single BWP into a single physical Shared Channel (SCH) in either UL or DL.

FIG. 2 shows one example of the outcome of LBT where LBT fails (medium sensed as "busy") on two of the four CCs/LBT sub-bands. Of course other LBT outcomes are possible, e.g. LBT failure on one or three of the CCs/bandwidth pieces.

In either mode, there is leakage from the transmissions on the used CCs/bandwidth pieces into the adjacent 20 MHz channels. For CA-based operation in LTE-eLAA (Mode 1), RAN4 has defined requirements on the Cumulative Adjacent Channel Leakage Ratio (CACLR) which are defined on a per-CC basis [3GPP TS 36.104, Section 6.6.2.2]:

The Cumulative Adjacent Channel Leakage power Ratio (CACLR) in a sub-block gap or the Inter RF Bandwidth gap is the ratio of:
 a) the sum of the filtered mean power centred on the assigned channel frequencies for the two carriers adjacent to each side of the sub-block gap or the Inter RF Bandwidth gap, and
 b) the filtered mean power centred on a frequency channel adjacent to one of the respective sub-block edges or Base Station RF Bandwidth edges.

The specification sets a maximum value on the CACLR which accounts for leakage from carriers on either side of a transmission gap, e.g. leakage from CC1 and CC3 into CC2 as shown in FIG. 2. From an implementation perspective, the device complies with this requirement by appropriate Radio Frequency (RF) filtering of the transmissions on each CC to limit the leakage into adjacent CCs.

For Mode 2, however, no such leakage requirements between LBT bandwidth pieces of a BWP have yet been defined by RAN4. However, it is clear that such requirements for in-channel (intra-BWP) leakage are needed for this mode of operation. Typically, in order to comply with adjacent channel leakage requirements, guardbands are introduced at the edges of a transmission in order to account for the fact that practical filters have a finite rolloff bandwidth. For the case of Mode 2, such intra-BWP guardbands are illustrated in FIG. 3 on either side of all four LBT sub-bands.

Interlace Transmissions in NR-U Uplink Channels

The adoption of NR in unlicensed bands requires some adaptation to comply with regulations. Two requirements are commonly found in regulations:
 i) Occupied Channel Bandwidth (OCB), and
 ii) Maximum Power Spectral Density (PSD).
For example, both these requirements are enforced for 5 GHz carriers according to European Telecommunications Standards Institute (ETSI) 301 893 while only the maximum PSD requirements are enforced in the US regulation for 5 GHz.

The occupied bandwidth requirement is expressed as the bandwidth containing 99% of the power of the signal and is to be between 80% and 100% of the declared nominal channel bandwidth.

Maximum PSD requirements exist in many different regions. For most cases, the requirement is stated with a resolution bandwidth of 1 MHz. For example, the ETSI 301 893 specs requires 10 decibel-milliwatts (dBm)/MHz for 5150-5350 MHz. The implication of the PSD requirement on the physical layer design is that, without proper designs, a signal with small transmission bandwidth will be limited in transmission power. This can negatively affect coverage. That is, the maximum PSD requirement is a binding condition that requires changes to UL transmissions in unlicensed spectrums.

ETSI regulations mandate a limit on the PSD in the 5 GHz band to 10 dBm per 1 MHz. The ETSI regulation defines the power density to be the mean Equivalent Isotropic Radiated Power (EIRP) over a transmission burst. In order to use the full output power for a smaller allocation, a Block Interleaved Frequency Division Multiple Access (FDMA) (BI-FDMA) approach can be used, also referred to as block interlaced transmission. FIG. 4 shows an example of interlace design for NR-U. Assume that the bandwidth is 20 MHz and subcarrier spacing is 30 kHz. After taking into account guardbands, the total number of PRBs available for scheduling is 51, where each PRB consists of 12 subcarriers. Those PRBs are divided into N=5 interlaces, each interlace consisting of M=10 (or 11) equally spaced PRBs. This design offers a good tradeoff between satisfying regulatory requirements on occupied bandwidth and transmit power spectral density, overhead required for RA signaling, and the degradation in single-carrier properties of the signal, i.e. increased Peak-to-Average Power Ratio (PAPR).

Frequency Domain RA for Interlaced Transmissions

To support interlace transmission, the signaling for frequency domain RA used in NR needs to be modified. What needs to be indicated to the UE in a DCI overhead efficient manner is (1) which interlaces are to be used, and (2) what subset of PRBs within each interlace are to be used. In another proposed solution, a method of partial interlace allocation was disclosed. It was proposed to include the following indicators in DCI to support partial interlace scheduling in which the DCI includes the following RA fields:
  Indicator of allocated interlaces(s),
  Indicators of which interlace(s) are to be partially scheduled, and
  RA indicator(s) of the scheduled PRBs in the interlace(s) which are partially scheduled.

SUMMARY

Systems and methods are disclosed herein that relate to frequency domain Resource Allocation (RA) for interlaced transmission. Embodiments of a method performed by a wireless device are disclosed. In one embodiment, a method performed by a wireless device comprises receiving a reserved resource indicator that indicates an uplink reserved resource pattern. The uplink reserved resource pattern defines at least which subset of uplink Physical Resource Blocks (PRBs) from among a set of allocated uplink PRBs are not available or are available for uplink transmission. In this manner, a low-overhead, flexible frequency domain RA scheme for partial interlace transmission is provided.

In one embodiment, the method further comprises transmitting an uplink transmission to at least a subset of the set of allocated uplink PRBs in accordance with the reserved resource indicator.

In one embodiment, the method further comprises receiving a frequency domain interlace allocation for the uplink transmission, wherein the frequency domain interlace allocation comprises an interlace indicator that indicates the set of allocated uplink PRBs. In one embodiment, M interlaces are defined for a bandwidth part or carrier bandwidth on which the uplink transmission is allocated, where M>1, and the bandwidth part or carrier bandwidth on which the uplink transmission is allocated is divided, in the frequency domain, into one or more Interlace Block Groups (IBGs). In one embodiment, the frequency domain interlace allocation further comprises an IBG indicator that indicates, from among the one or more IBGs of the bandwidth part or carrier bandwidth, at least one IBG in which the set of allocated PRBs are allocated for the uplink transmission. Further, the interlace indicator indicates which interlaces within the at least one IBG indicated by the IBG indicator are allocated for the uplink transmission.

In one embodiment, each IBG consists of K Interlace Blocks (IBs), where K is an integer value that is greater than or equal to 1.

In another embodiment, each IBG consists of up to K IBs, where K is an integer value that is greater than or equal to 1. In one embodiment, the one or more IBGs comprise one or more full IBGs each consisting of K IBs and a partial IBG consisting of at least one PRB.

In another embodiment, each IBG consists of at least K IBs, where K is an integer value that is greater than or equal to 1. In one embodiment, the one or more IBGs comprise one or more full IBGs each consisting of K IBs and an extended IBG consisting of more than M PRBs.

In one embodiment, each IB consists of up to M contiguous PRBs in the frequency domain. In one embodiment, at least one IB in at least one of the one or more IBGs is a partial IB comprising less than M contiguous PRBs in the frequency domain. In one embodiment, all remaining IBs of the at least one of the one or more IBGs and all IBs of all of the other IBGs from among the one or more IBGs are full IBs each consisting of M contiguous PRBs in the frequency domain.

In one embodiment, each IB consists of at least M contiguous PRBs in the frequency domain. In one embodiment, at least one IB in at least one of the one or more IBGs is an extended IB comprising more than M contiguous PRBs in the frequency domain. In one embodiment, all remaining IBs of the at least one of the one or more IBGs and all IBs of all of the other IBGs from among the one or more IBGs are full IBs each consisting of M contiguous PRBs in the frequency domain.

In one embodiment, the interlace indicator indicates, from among the M interlaces, one or more interlaces that are allocated for the uplink transmission within the K IBs in at least one of the one or more IBGs. In one embodiment, the interlace indicator comprises a bitmap wherein the m-th position in the bitmap indicates whether a respective interlace from among the M interlaces is allocated for the uplink transmission. In one embodiment, the interlace indicator comprises an index to a table of predefined interlace index combinations. In one embodiment, the interlace indicator comprises a list of interlace indices.

In one embodiment, at least one of the one or more IBGs consists of a non-integer number of IBs but an integer number of PRBs. In one embodiment, a particular IBG from among the one or more IBGs consists of a number of contiguous PRBs with a lowest PRB index i and a highest PRB index j, wherein j>i. In one embodiment, the index i and the index j correspond to a particular sub-band of the bandwidth part or carrier bandwidth in which Listen-Before-Talk (LBT) operation is performed. In one embodiment, the method further comprises receiving indications of the index i and the index j via higher layer signaling.

In one embodiment, receiving the frequency domain interlace allocation for the transmission comprises receiving the interlace indicator via (a) Downlink Control Information (DCI) signaling, (b) Medium Access Control (MAC) Control Element (CE) signaling, (c) higher layer signaling, or (d) a combination of any two or more of (a)-(c).

In one embodiment, the uplink transmission is one or more of: a Physical Uplink Shared Channel (PUSCH) transmission, a Physical Uplink Control Channel (PUCCH) transmission, a Sounding Reference Signal (SRS) transmission, and a Physical Random Access Channel (PRACH) transmission.

In one embodiment, the reserved resource pattern indicator comprises a bitmap where the i-th position of the bitmap indicates whether a respective PRB is available or is not available.

In one embodiment, the reserved resource pattern indicator comprises a bitmap where the j-th position of the bitmap indicates whether all PRBs within a respective IB are available or are not available.

In one embodiment, the reserved resource pattern indicator comprises a bitmap where the j-th position of the bitmap indicates whether all PRBs within a respective IBG are available or are not available.

In one embodiment, the reserved resource pattern indicator comprises a list of PRB indices.

In one embodiment, the reserved resource pattern indicator comprises a list of IB indices.

In one embodiment, the reserved resource pattern indicator comprises a list of IBG indices.

In one embodiment, receiving the reserved resource indicator comprises receiving the reserved resource indicator via dynamic signaling, semi-static signaling, or a combination of dynamic signaling and semi-static signaling.

In one embodiment, receiving the reserved resource indicator comprises receiving the reserved resource indicator via DCI, where the DCI is a DCI used for scheduling uplink resources. In one embodiment, the scheduled uplink resources are for (a) a PUSCH transmission, (b) a PUCCH transmission, (c) an SRS transmission, or (d) a combination of any two or more of (a)-(c).

In one embodiment, receiving the reserved resource indicator comprises receiving the reserved resource indicator via semi-static signaling, and the uplink transmission is not scheduled by DCI. In one embodiment, the uplink transmission not scheduled by DCI is (a) a configured grant PUSCH transmission, (b) a PUCCH transmission, (d) an SRS transmission, or (e) a combination of any two or more of (a)-(c).

Corresponding embodiments of a wireless device are also disclosed. In one embodiment, a wireless device is adapted to receive a reserved resource indicator that indicates an uplink reserved resource pattern, wherein the uplink reserved resource pattern defines at least which subset of uplink PRBs from among a set of allocated uplink PRBs are not available or are available for uplink transmission.

In one embodiment, the wireless device comprises one or more transmitters, one or more receivers, and processing circuitry associated with the one or more transmitters and the one or more receivers. The processing circuitry is configured to cause the wireless device to receive the reserved resource indicator that indicates the uplink reserved resource pattern.

Embodiments of a method performed by a base station are also disclosed. In one embodiment, a method performed by a base station comprises transmitting, to a wireless device, a reserved resource indicator that indicates an uplink reserved resource pattern, wherein the uplink reserved resource pattern defines at least which subset of uplink PRBs from among a set of allocated uplink PRBs are not available or are available for uplink transmission.

Corresponding embodiments of a base station are also disclosed. In one embodiment, a base station is adapted to transmit, to a wireless device, a reserved resource indicator that indicates an uplink reserved resource pattern, wherein the uplink reserved resource pattern defines at least which subset of uplink PRBs from among a set of allocated uplink PRBs are not available or are available for uplink transmission.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 6 illustrates an example frequency domain interlace allocation in which a set of contiguous IBGs are indicated by an IBG Resource Indicator Value (RIV) which jointly encodes start IBG index=1 and length (# of IBGs)=3, in accordance with one embodiment of the present disclosure. The interlace indicator is the bitmap [1 0 0 1 0] indicating that interlaces 0 and 3 are allocated.

FIG. 7 illustrates an example frequency domain interlace allocation in which a set of non-contiguous IBGs are indicated by an IBG bitmap [0 1 0 0 1 0] indicating that IBGs 1 and 4 are allocated, in accordance with one embodiment of the present disclosure. The interlace indicator bitmap is the bitmap [1 0 0 1 0] indicating that interlaces 0 and 3 are allocated.

FIG. 8 illustrates an example frequency domain interlace allocation (same as FIG. 6) but with Physical Resource Block (PRB) level reserved resource indication in which the first two and the last two PRBs are reserved (not available for transmission), in accordance with one embodiment of the present disclosure.

FIG. 9 illustrates an example frequency domain interlace allocation (same as FIG. 6) but with IB-level reserved resource indication in which the first and last IBs are reserved (not available for transmission), in accordance with one embodiment of the present disclosure.

FIGS. 19 through 22 are flow charts illustrating methods implemented in the communication system of FIG. 17 in accordance with embodiments of the present disclosure.

FIG. 26 illustrates performance of candidate E-PF3 Physical Uplink Control Channel (PUCCH) design for (a) four (4) Orthogonal Frequency Division Multiplexing (OFDM) symbols and (b) fourteen (14) OFDM symbols.

DETAILED DESCRIPTION

Figure 1:
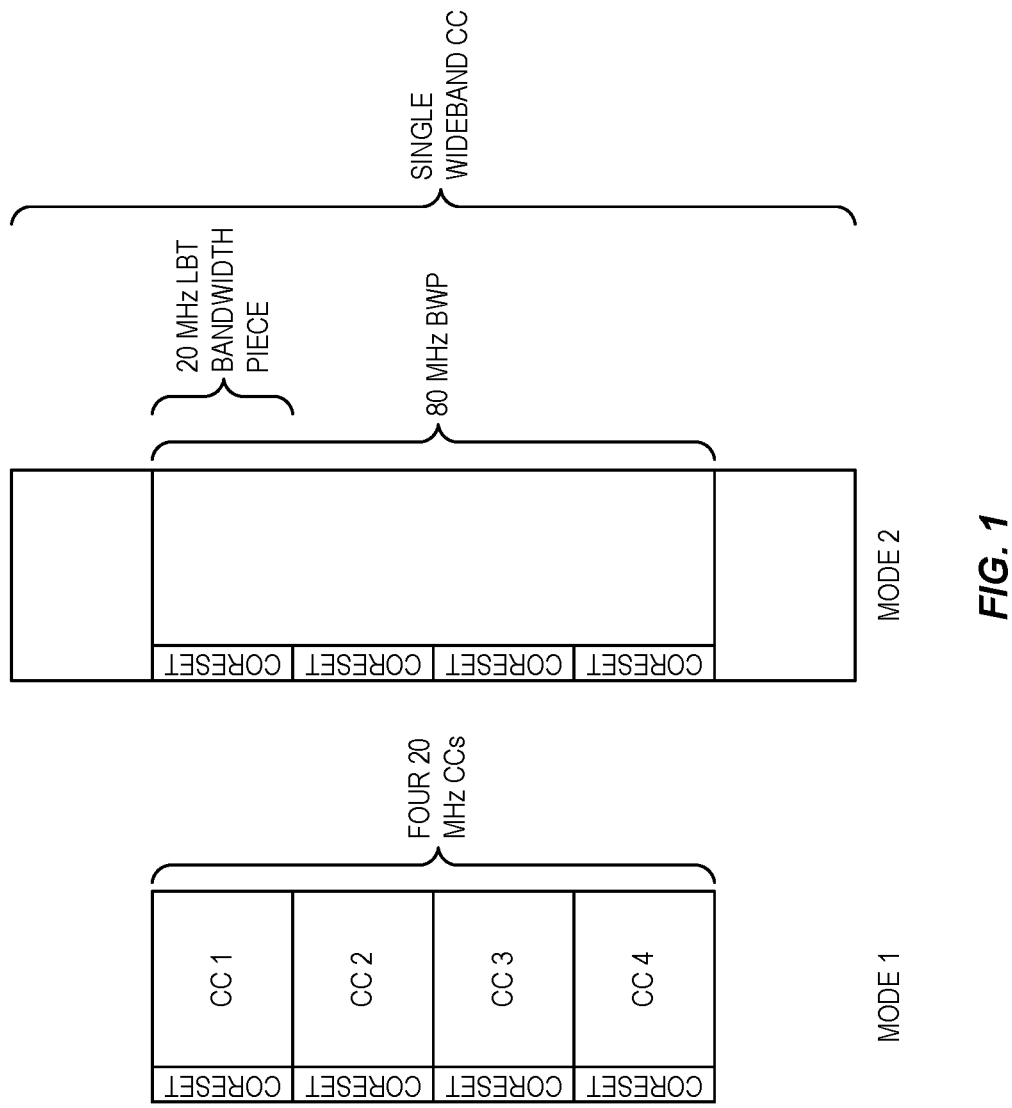
FIG. 1 illustrates an example of two wideband operation modes in New Radio (NR) in unlicensed spectrum (NR-U), namely, Mode 1 which is based on Carrier Aggregation (CA) and Mode 2 which is based on a single wideband carrier. Note that Listen-Before-Talk (LBT) bandwidth piece and LBT sub-band are equivalent terms.
Figure 2:
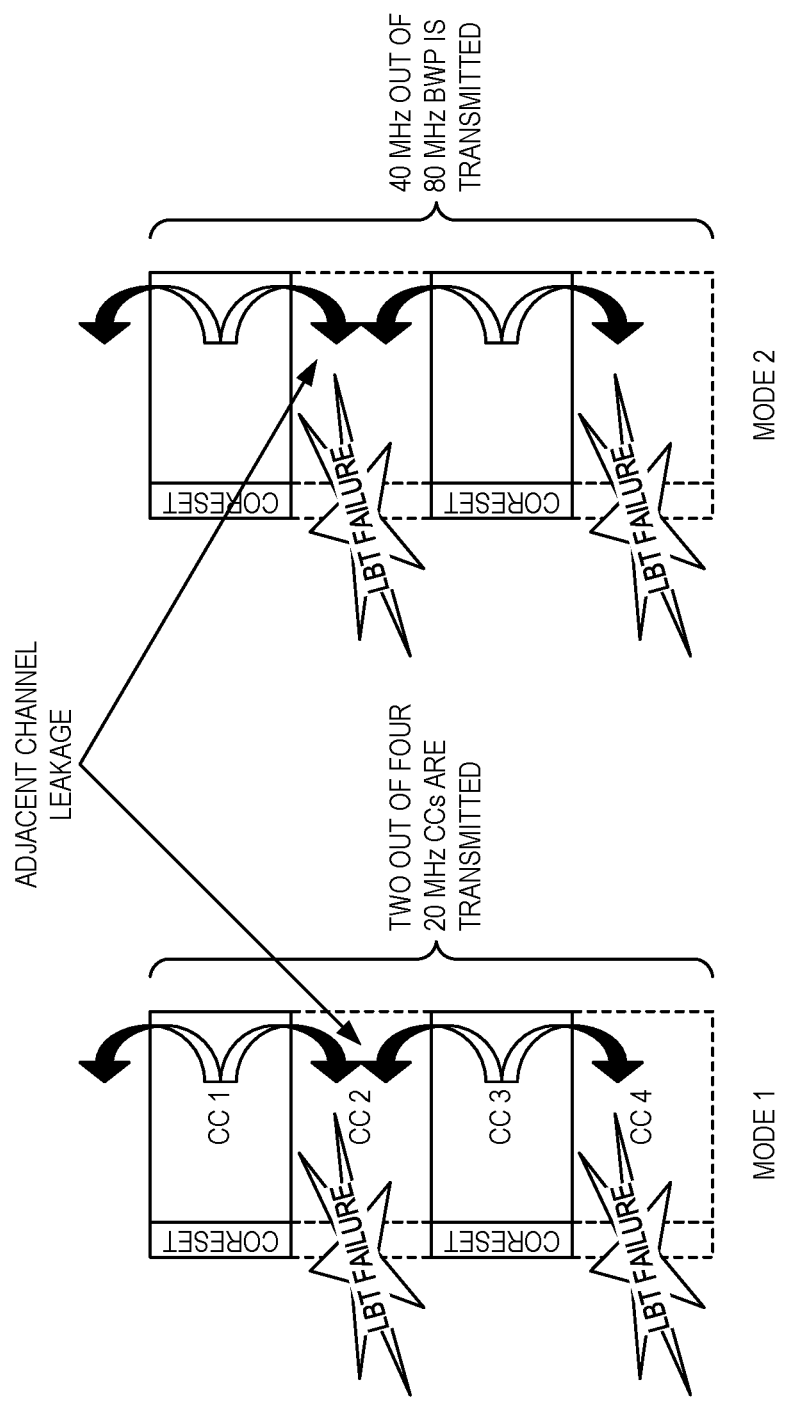
FIG. 2 shows one example of the outcome of LBT where LBT fails (medium sensed as "busy") on two of four Component Carriers (CCs)/LBT sub-bands.
Figure 3:
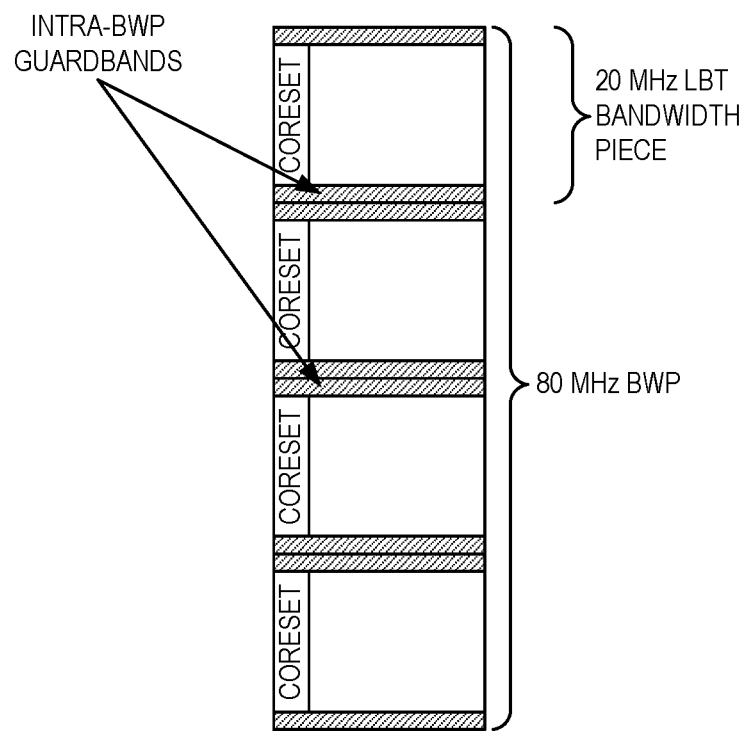
FIG. 3 illustrates intra-Bandwidth Part (BWP) guardbands on either side of each LBT sub-band (equivalent to "LBT bandwidth piece").

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) in regard to frequency domain Resource Allocation (RA) for interlaced transmissions. Certain partial interlace allocation solutions incur unnecessarily high Downlink Control Information (DCI) overhead due to separate indication of full/partial interlaces allocation and separate indication of what portion of each partial interlace is allocated.

Figure 4:
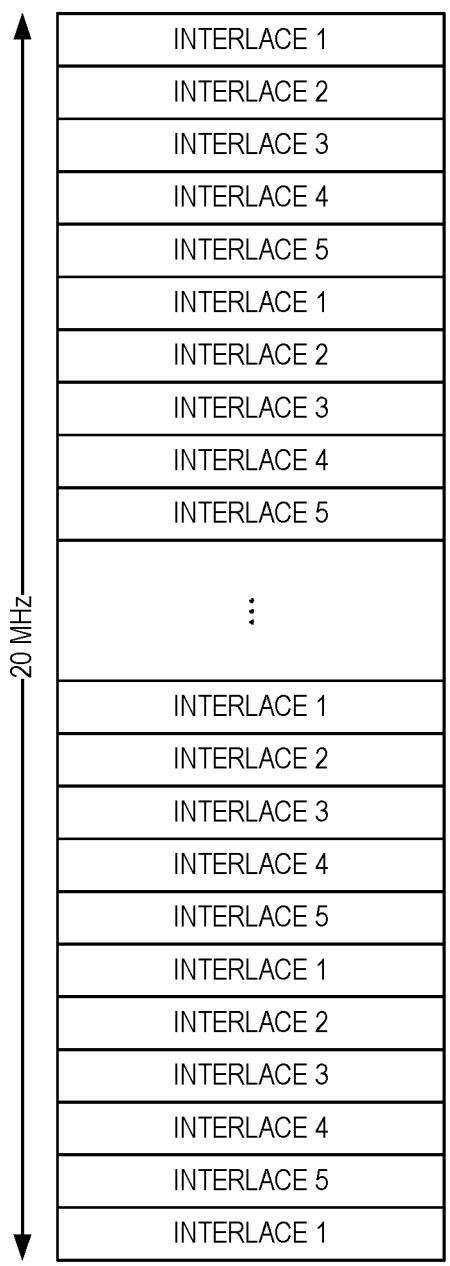
FIG. 4 illustrates an example interlacing design for NR-U with 20 megahertz (MHz) bandwidth, 30 kilohertz (kHz) subcarrier spacing, and five interlaces.

Certain aspects of the present disclosure and their embodiments may provide solutions to the aforementioned or other challenges. Embodiments of a method of signaling partial interlace allocation are disclosed that achieve low signaling overhead. To achieve low overhead, the method is based on allocation of frequency domain resources with a granularity of an Interlace Block Group (IBG). An IBG consists of K Interlace Blocks (IBs) where K≥1. Each IB consists of M>1 contiguous Physical Resource Blocks (PRBs) where M is the number of interlaces defined for a Bandwidth Part (BWP) or carrier, e.g. M=5 as shown in FIG. 4.

Two approaches are disclosed for signaling the allocated IBGs. The first approach uses a bitmap with length equal to the number of IBGs, and thus enables indication of arbitrary IBGs, either contiguous or non-contiguous. The second approach is based on indication of a start IBG and length (number of IBGs) encoded into a Resource Indication Value (RIV) and thus enables indication of a set of contiguous IBGs. In both approaches, the partial interlace allocation applies to all defined interlaces, thus reducing the overhead compared to certain other partial interlace allocation solutions where a separate RA per partial interlace is used.

Embodiments are also disclosed herein for a mechanism to indicate reserved resources which are excluded from the indicated allocation of IBGs. The granularity of the reserved resources is defined to be less than an IBG, e.g. IB-level granularity or PRB-level granularity.

Certain embodiments may provide one or more of the following technical advantage(s). For example, embodiments of the present disclosure provide the following advantages:

Embodiments of the present disclosure provide a low overhead method of indicating partial interlace allocation which is particularly useful in the case of wideband carriers (large number of PRBs).

In combination with indication of reserved resources, the method offers very flexible RA.

Embodiments of the present disclosure provide a framework that can be used for any interlaced signal, e.g.

Physical Uplink Shared Channel (PUSCH), Physical Uplink Control Channel (PUCCH), Sounding Reference Signal (SRS), etc., regardless of whether dynamic (DCI based) or semi-static (Radio Resource Control (RRC) based) indication is used.

Figure 5:
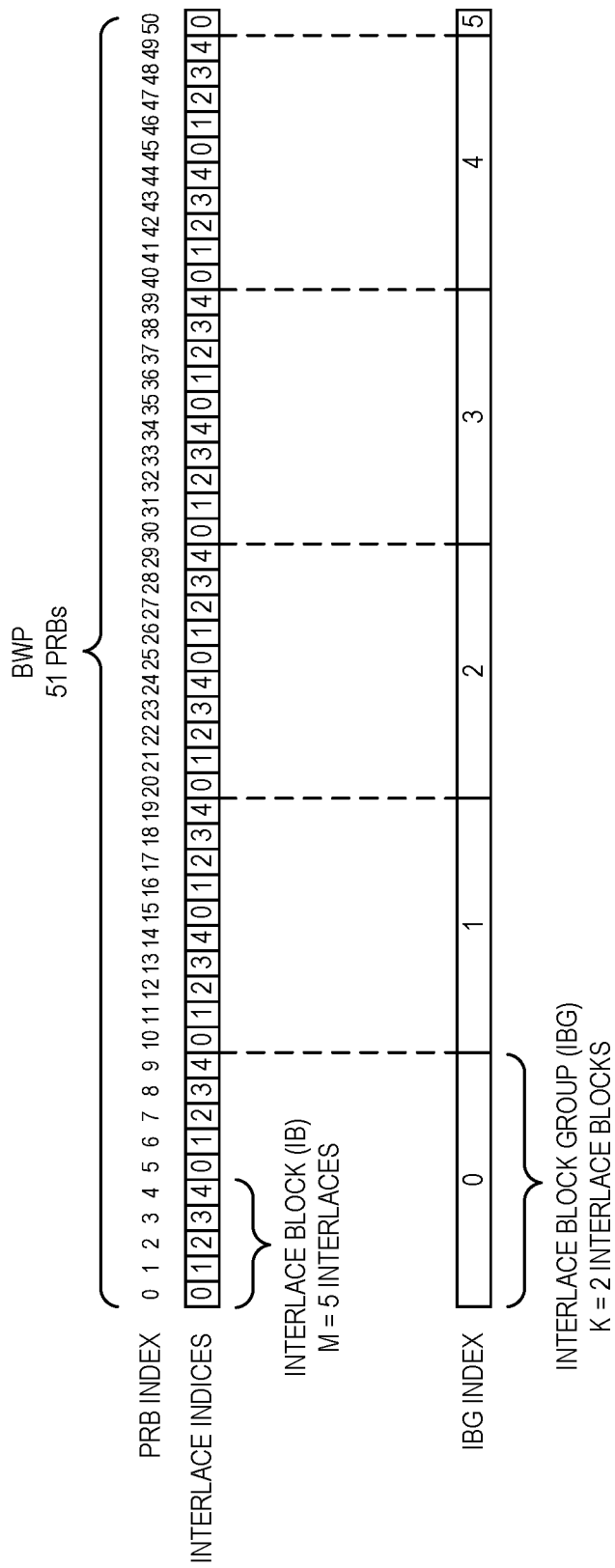
FIG. 5 illustrates examples of Interlace Blocks (IBs) and Interlace Block Groups (IBGs) in accordance with some embodiments of the present disclosure.

Embodiments of a method of signaling partial interlace allocation is disclosed in which resources are allocated with a granularity of an IBG. In some embodiments, an IBG consists of up to K IBs, where K≥1. In some embodiments, each interlace block consists of up to M>1 contiguous PRBs where M is the number of interlaces defined for a BWP or carrier. One non-limiting example configuration is shown in FIG. 5 in which a BWP is configured with 51 PRBs. M=5 interlaces are defined which determines the size of an interlace block (five contiguous PRBs). In this example, an IBG consists of K=2 interlace blocks; hence, there are five full IBGs (IBG 0, 1, 2, 3, 4) and one partial IBG (IBG 5). Thus, each IBG includes "up to" K IBs since, due to the number of PRBs in the BWP and the size (K) of the IBGs, there may end up being one partial IBG, as in the example given above where there are five full IBGs including K IBs and one partial IBG including less than K IBs. In fact, the one partial IBG includes one partial IB, where in this example the partial IB consists of a single PRB. Thus, in a similar manner, there may be some scenarios in which one or more of the IBGs include at least one partial IB in which there are less than M contiguous PRBs due to the number of PRBs in the BWP and the number of interlaces. For instance, in the example above, the one partial IBG includes only one IB, and this single IB is a partial IB that includes only one PRB.

Note that, in some alternative embodiments, each IBG consists of at least K IBs where K 1. So, in this case, there may be some scenarios in which there are a certain number of full IBGs each consisting of K IBs and at least one extended IBG that includes more than K IBs.

In some alternative embodiments, at least one of the IBGs (could be a full IBG consisting of K IBs, a partial IB consisting of less than K IBs, or an extended IB consisting of more than K IBs) includes at least one IB that is an extended IB consisting of more than M contiguous PRBs.

Now, the discussion turns to a description of a number of "Embodiments". Note that these Embodiments, while described separately, may be used together in any desired or suitable combination.

1 Embodiments

1.1 Embodiment #1

In one variation of this embodiment, the frequency domain interlace allocation signaling includes the following two indicators:

IBG Indicator
  Indicates a subset (or full set) of the IBGs within a BWP
Interlace indicator
  Indicates which interlaces within the IBs of the indicated IBGs are allocated.

In another variation of this embodiment, the frequency domain interlace allocation signaling includes either or both of the following indicators:

IBG Indicator
  Indicates a subset (or full set) of the IBGs within a BWP
Interlace Indicator
  Indicates which interlaces within the IBs of the indicated IBGs are allocated In one non-limiting embodiment, the same interlaces in all IBs of the indicated IBGs are allocated.

Figures 6, 7:
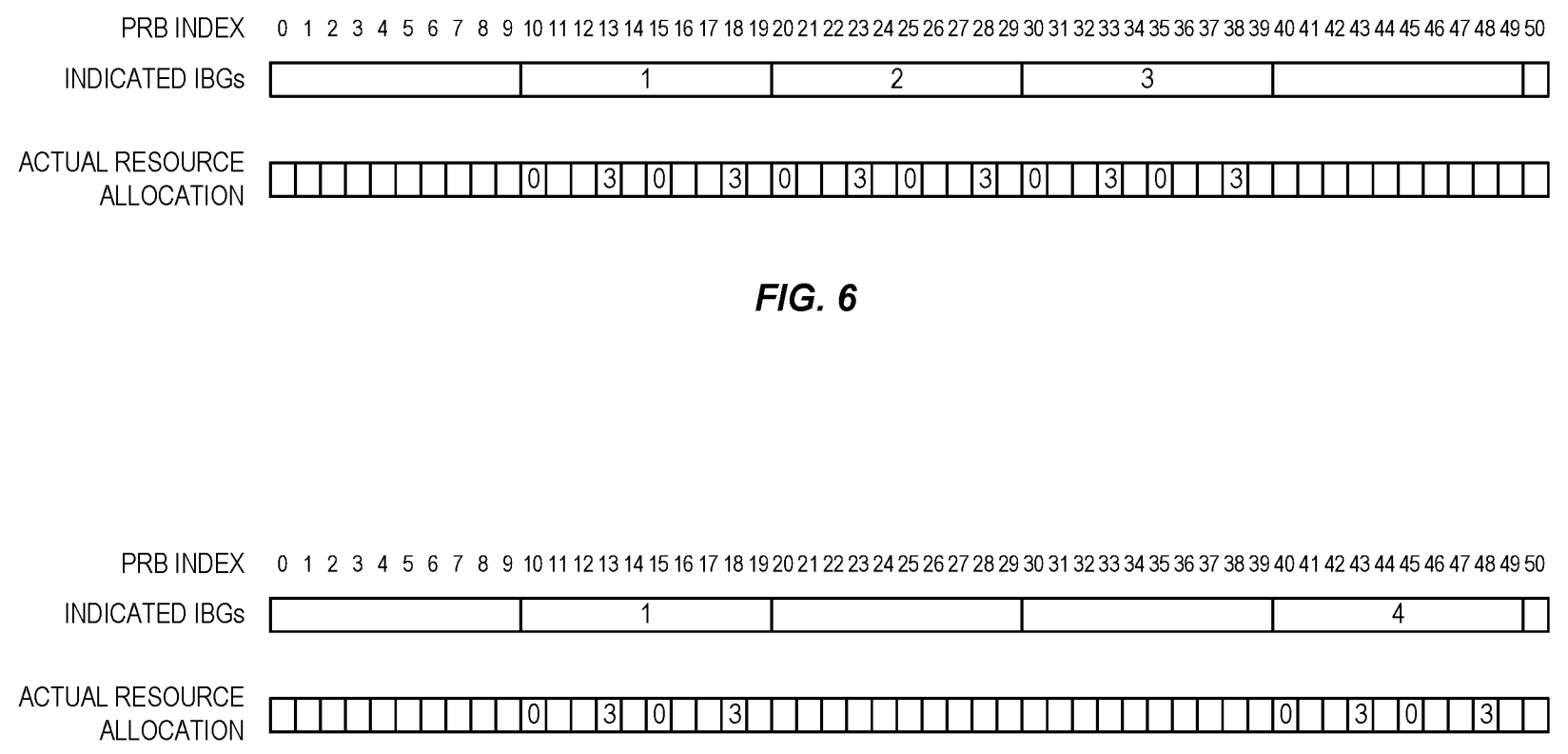

FIGS. 6 and 7 show examples of contiguous and non-contiguous IBG indications, respectively. In FIG. 6, IBGs 1, 2, and 3 are indicated, whereas in FIG. 7, IBGs 1 and 4 are indicated. In both examples, interlaces 0 and 3 are indicated. The second row in each diagram shows the actual frequency domain RA based on the two signaled indicators.

1.2 Embodiment #2

Embodiment #2 builds on Embodiment #1 where the IBG Indicator is one of the following:

An IBG RIV which consists of a joint encoding of the start IBG index and length (# of contiguous IBGs).
  One example joint encoding is the following:

if $(L_{IBGs}-1) \leq \lfloor N_{BWP}^{IBG}/2 \rfloor$ then $$RIV = N_{BWP}^{IBG}(L_{IBGs}-1) + IBG_{start}$$

Else $$RIV = N_{BWP}^{IBG}(N_{BWP}^{IBG} - L_{IBGs} + 1) + (N_{BWP}^{IBG} - 1 - IBG_{start})$$

where $IBG_{start}$ is the start IBG index, $L_{IBGs}$ is the length (# of contiguous IBGs), and $N_{BWP}^{IBG}$ is the number of IBGs in the BWP.
  For example, in FIG. 6, $IBG_{start}$ IBGs=3, and $N_{BWP}^{IBG}=6$ A length $N_{BWP}^{IBG}$ IBG bitmap where a '1'/'0' (or '0'/'1') in the n-th bit position of the bitmap indicates that IBG index n is allocated/not allocated.
  For example, in FIG. 7, the length-6 IBG bitmap [0 1 0 0 1 0] indicates that IBGs 1 and 4 are allocated.

An index to an entry in a table of predefined IBG combinations (contiguous or non-contiguous)
  For example:

| IBG Indicator | IBG Combination |
|---|---|
| 0 | 0, 1 |
| 1 | 2, 3 |
| 2 | 3, 4, 5 |
| ... | |

A list of IBG indexes, e.g. {1, 4}

1.3 Embodiment #3

Embodiment #3 builds on Embodiments #1 or #2 wherein the Interlace indicator is one of the following:

A length-M bitmap where a '1'/'0' (or '0'/'1') in the m-th bit position of the bitmap indicates that interlace index m is allocated/not allocated.
An index to an entry in a table of predefined interlace index combinations.

For example:

| Interlace Indicator | Interlace Index Combination |
|---|---|
| 0 | 1 |
| 1 | 1, 3 |
| 2 | 2, 3, 4 |
| ... | |

A list of interlace indices, e.g. {2, 3, 4}

1.4 Embodiment #4

Embodiment #4 builds on Embodiment #1, #2, or #3, wherein an IBG consists of a non-integer number of IBs, but an integer number of PRBs.

1.4.a Embodiment #4a

Embodiment #4a builds on Embodiment #4, wherein a particular IBG consists of a number of contiguous PRBs with the lowest PRB index i and the highest PRB index j>i.

1.4.b Embodiment #4b

Embodiment #4b builds on Embodiment #4a, wherein the PRB indices i and j correspond to a particular sub-band of the BWP in which LBT operation is performed, referred to as an LBT sub-band or LBT bandwidth.

1.4.c Embodiment #4c

Embodiment #4c builds on Embodiment #4b, where in the indices i and j are indicated to the UE via higher layer signaling (e.g., RRC signaling).

1.5 Embodiment #5

Embodiment #5 builds on Embodiment #1, #2, #3, #4, #4a, #4b, or #4c wherein the IBG Indicator and Interlace indicator are signaled to the UE by one or a combination of the following:
  dynamically via DCI signaling,
  dynamically via Medium Access Control (MAC) Control Element (CE) signaling, or
  semi-statically via higher layer signaling (e.g., RRC signaling).

1.6 Embodiment #6

Embodiment #6 builds on any of the above embodiments where the frequency domain interlace allocation applies to one or more of the following uplink signals: PUSCH, PUCCH, SRS, and Physical Random Access Channel (PRACH) (i.e., PUSCH, PUCCH, SRS, and/or PRACH).

1.7 Embodiment #7

Embodiment #7 builds on any of the above embodiments where the frequency domain interlace allocation applies to one or more of the following downlink signals: PDSCH, PDCCH, and Channel State Information Reference Signal (CSI-RS) (i.e., PDSCH, PDCCH, and/or CSI-RS).

1.8 Embodiment #8

Embodiment #8 builds on any of the above embodiments and additionally includes a Reserved Resource Indicator which refers to one of a plurality of pre-configured reserved resource patterns wherein each pattern indicates which PRBs amongst the plurality of PRBs allocated by the IBG Indicator and/or Interlace indicator(s) are not available or are available either for transmission from the UE or for reception by the UE.

1.9 Embodiment #9

Figures 8, 9:
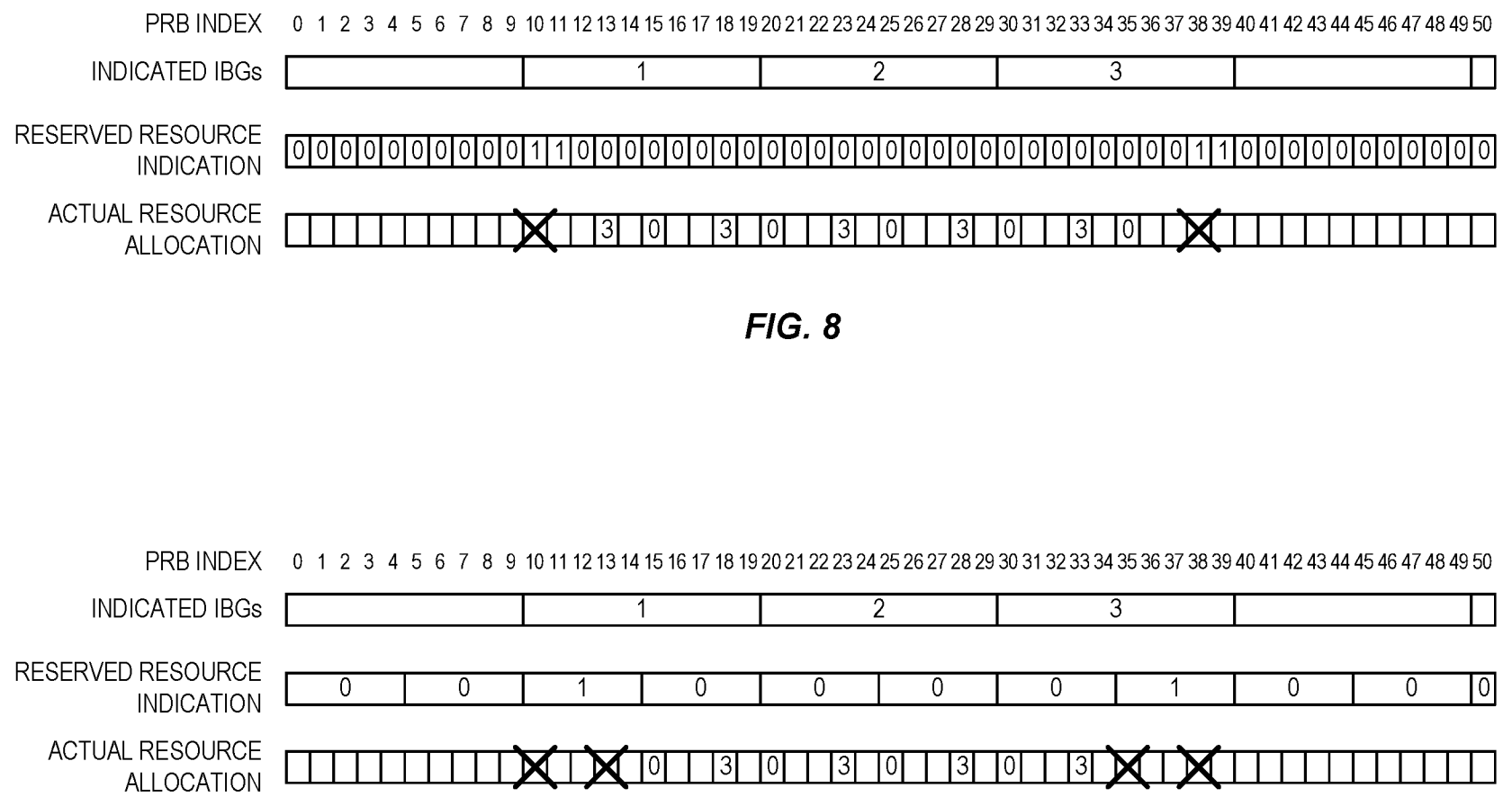

Embodiment #9 builds on Embodiment #8 wherein a reserved resource pattern consists of one of the following:
  A bitmap in which a '1'/'0' (or '0'/'1') in the i-th position of the bitmap indicates that that the i-th PRB is not available/is available.
    A non-limiting example of such a PRB-level bitmap is shown in FIG. 8.
  A bitmap in which a '1'/'0' (or '0'/'1') in the j-th position of the bitmap indicates that that all PRBs within the j-th IB are not available/are available.
    A non-limiting example of a IB-level bitmap for the Reserved Resource Indicator is shown in FIG. 9.
  A list of PRB indices which are not/are available.
  A list of IB indices which are/are not available.

1.10 Embodiment #10

Embodiment #10 builds on Embodiment #9 wherein the reserved resource pattern(s) are semi-statically configured to the UE via higher layer signaling (e.g., RRC signaling).

1.11 Embodiment #11

Embodiment #11 builds on any of Embodiments #8-#10 wherein the Reserved Resource Indicator is signaled to the UE by one of the following:
  dynamically via DCI signaling, or
  dynamically via MAC CE signaling.

1.12 Embodiment #12

Embodiment #12 builds on Embodiment #11 wherein the DCI is a DCI used for the purposes of scheduling uplink resources, e.g. DCI 0_0 or 0_1.

2 Additional Description

Figure 10:
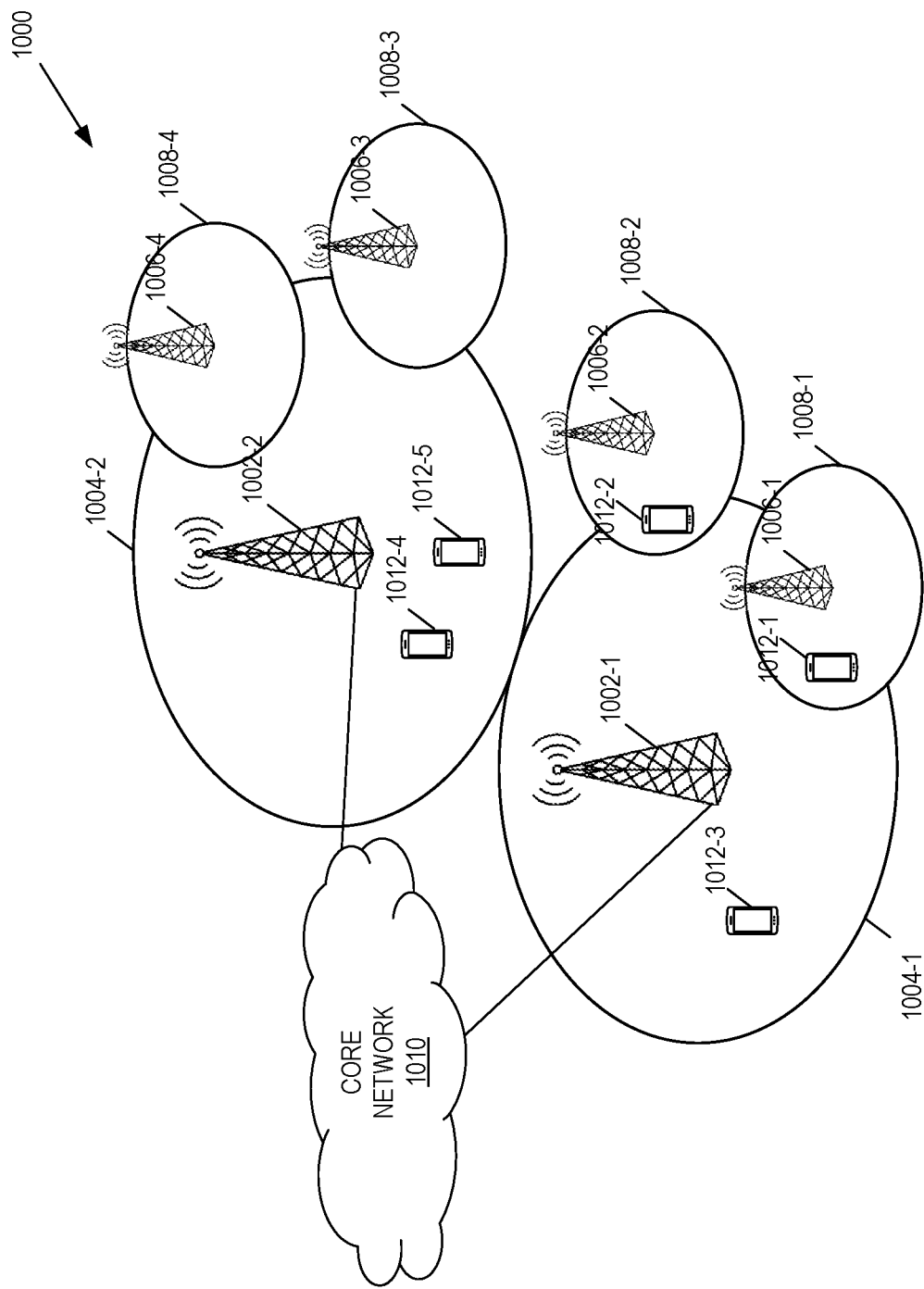
FIG. 10 illustrates one example of a cellular communications system in which embodiments of the present disclosure may be implemented.

FIG. 10 illustrates one example of a cellular communications system 1000 in which embodiments of the present disclosure (e.g., Embodiments #1-#12 described above) may be implemented. In the embodiments described herein, the cellular communications system 1000 is a 5G system (5GS) including a NR RAN; however, the embodiments described herein are not limited to NR and may be utilized in any suitable type of wireless communication system that utilizes interlace transmissions. In this example, the RAN includes base stations 1002-1 and 1002-2, which in 5G NR are referred to as gNBs, controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5GS is referred to as the 5G core (5GC). The base stations 1002 (and optionally the low power nodes 1006) are connected to the core network 1010.

The base stations 1002 and the low power nodes 1006 provide service to wireless devices 1012-1 through 1012-5 in the corresponding cells 1004 and 1008. The wireless devices 1012-1 through 1012-5 are generally referred to herein collectively as wireless devices 1012 and individually as wireless device 1012. The wireless devices 1012 are also sometimes referred to herein as UEs.

In some embodiments, at least some of the cells 1004 and/or 1008 are in the unlicensed spectrum (e.g., are NR in Unlicensed Spectrum (NR-U) cells). Further, in some embodiments, at least some of these cells use interlace transmissions in (e.g., NR-U) uplink channels and/or in (e.g., NR-U) downlink channels.

Figure 11:
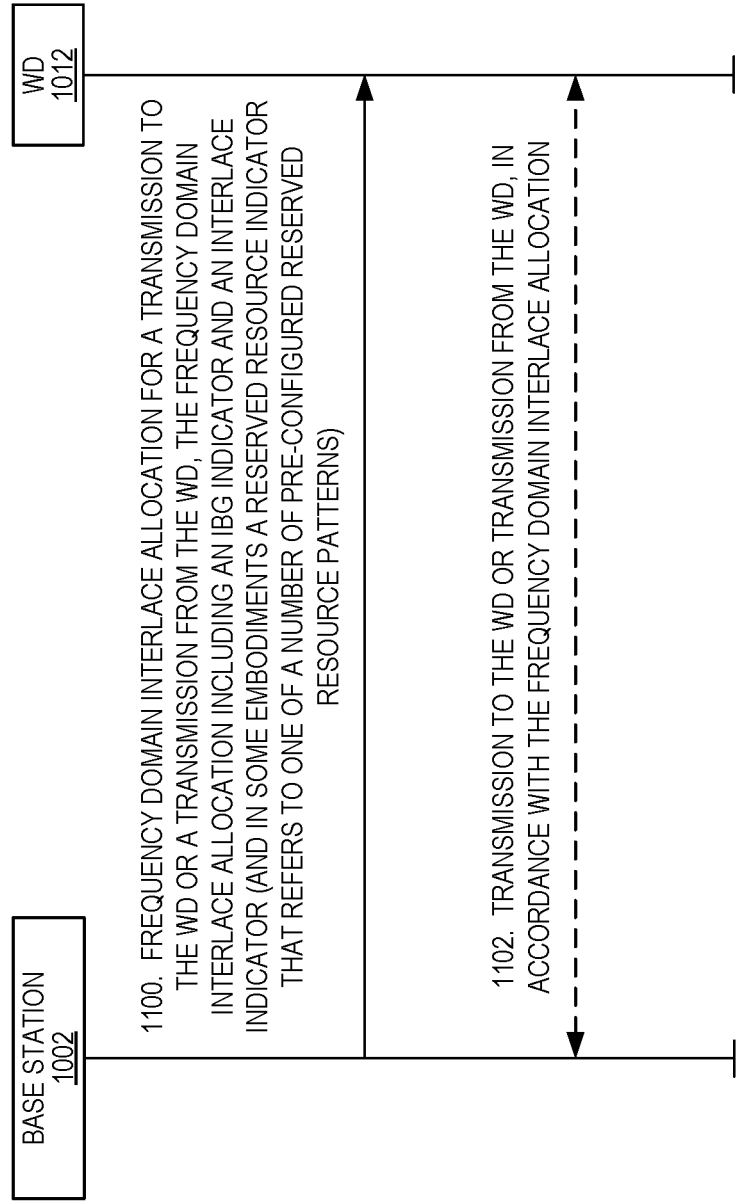
FIG. 11 illustrates the operation of a base station and a wireless device in accordance with at least some of the aspects of the embodiments described of the present disclosure.

FIG. 11 illustrates the operation of a base station 1002 and a wireless device 1012 (e.g., UE) in accordance with at least some of the aspects described above with respect to Embodiments #1-#12. Optional steps are represented by dashed lines. As illustrated, the base station 1002 transmits, to the wireless device 1012, a frequency domain interlace allocation for a downlink transmission to the wireless device 1012 (i.e., a downlink (DL) transmission) or an uplink transmission from the wireless device 1012 (e.g., an UL transmission) (step 1100). Optionally, the base station 1002 transmits and the wireless device 1012 receives the downlink transmission or the wireless device 1012 transmits and the base station 1002 receives the uplink transmission, in accordance with the frequency domain interlace allocation (step 1102).

Any or all of the aspects of Embodiments #1-#12 described above may be incorporated into the process of FIG. 11.

Figure 23:
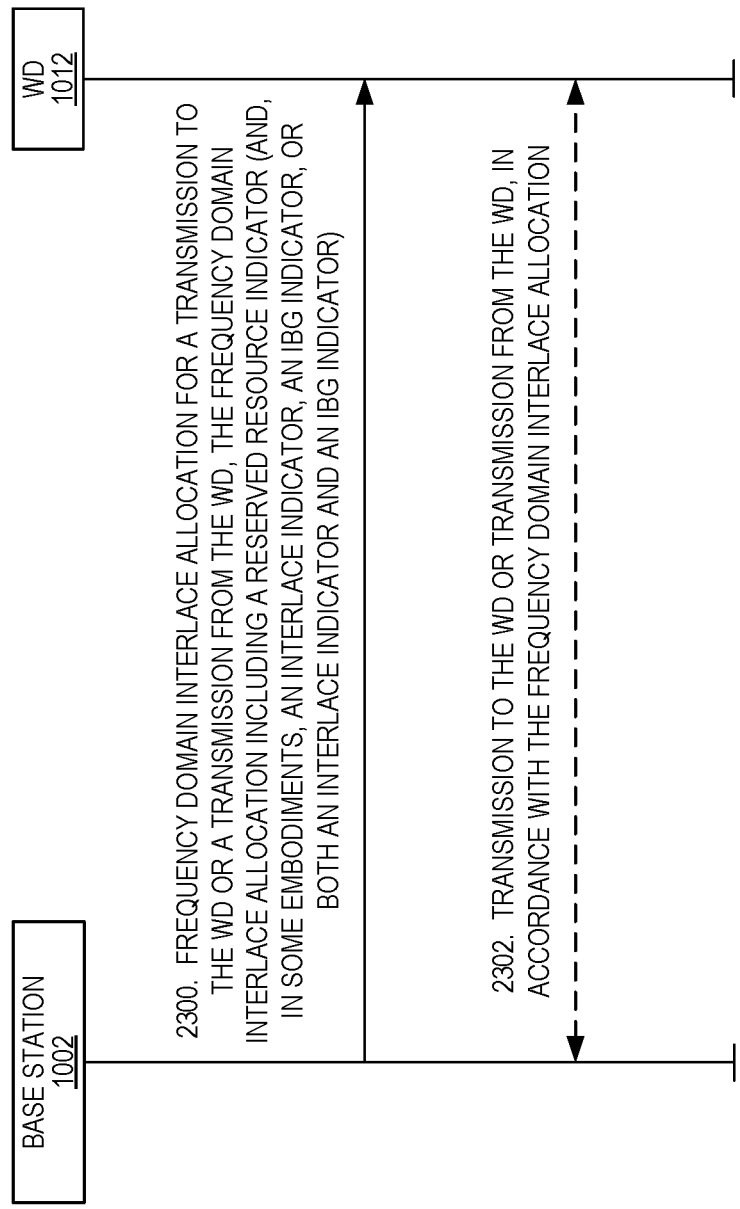
FIG. 23 illustrates the operation of a base station and a wireless device in accordance with at least some of the aspects of embodiments of the present disclosure.

FIG. 23 illustrates the operation of a base station 1002 and a wireless device 1012 (e.g., UE) in accordance with at least some of the aspects described above with respect to Embodiments #1-#12. Optional steps are represented by dashed lines. As illustrated, the base station 1002 transmits, to the wireless device 1012, a frequency domain interlace allocation for a downlink transmission to the wireless device 1012 (i.e., a DL transmission) or an uplink transmission from the wireless device 1012 (e.g., an UL transmission) (step 2300). In this example, the frequency domain interlace allocation includes a reserved resource indicator, as described above. In some embodiments, the frequency domain interlace allocation also includes an interlace indicator, an IBG indicator, or both an interlace indicator and an IBG indicator. Note that while the reserved resource indicator is sent in the frequency domain interlace allocation in this example, the present disclosure is not limited thereto. In some other embodiments, the reserved resource indicator is sent separately from the frequency domain interlace allocation and by various different means (e.g., DCI, RRC, or a combination of DCI and RRC signaling). Thus, the reserved resource indicator may be received via dynamic signaling (e.g., via DCI or MAC CE), via semi-static signaling (e.g., higher layer signaling such as, e.g., RRC signaling), or a combination thereof. Some examples are:

(1) Interlace indication in DCI, reserved resource pattern by RRC
(2) Interlace indication in DCI, reserved resource indication by DCI where the DCI "points" to one of a plurality of pre-configured (by RRC) reserved resource patterns
(3) Interlace indication in RRC, reserved resource indication by RRC. This example would be more relevant for control channels (PUCCH) where everything is semi-statically configured by RRC. Examples (1) and (2) are more relevant for the data channel (iPUSCH).

In one embodiment, the transmission is an uplink transmission, and the reserved resource indicator is received via DCI wherein the DCI is a DCI used for scheduling uplink resources (e.g., DCI 0_0 or DCI 0_1). In one embodiment, the scheduled uplink resources are for a PUSCH transmission, a PUCCH transmission, an SRS transmission, or any combination thereof.

In one embodiment, the transmission is an uplink transmission, and the reserved resource indicator is received via semi-static signaling (e.g., via higher layer signaling such as, e.g., RRC signaling), and the uplink transmission is not scheduled by DCI. In one embodiment, the uplink transmission is a configured grant PUSCH transmission, a PUCCH transmission, an SRS transmission, or any combination thereof.

Optionally, the base station 1002 transmits and the wireless device 1012 receives the downlink transmission or the wireless device 1012 transmits and the base station 1002 receives the uplink transmission, in accordance with the frequency domain interlace allocation (step 2302). In one embodiment, the transmission is an uplink transmission. The uplink transmission may be a PUSCH transmission, a PUCCH transmission, an SRS transmission, or a PRACH transmission.

Any or all of the aspects of Embodiments #1-#12 described above may be incorporated into the process of FIG. 23.

Figure 12:
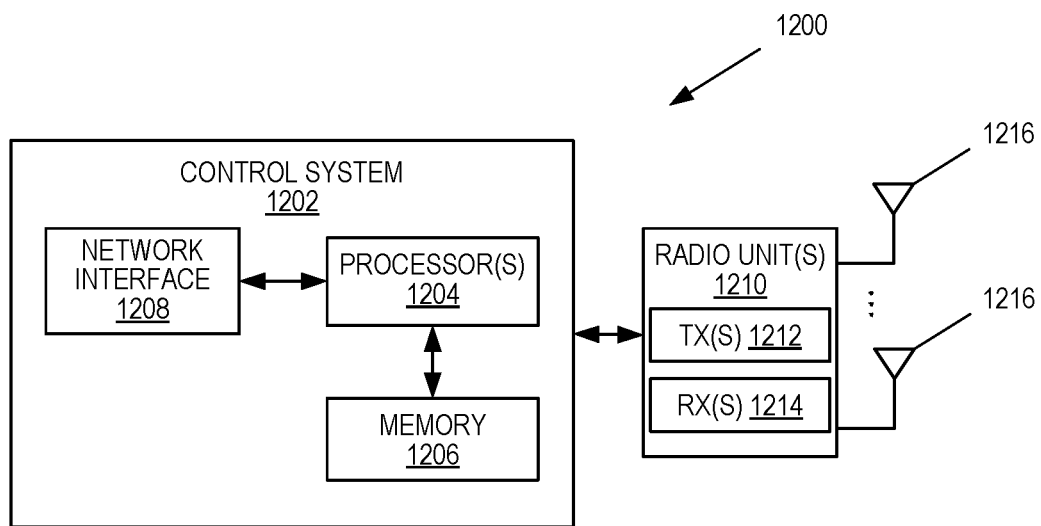
FIGS. 12 through 14 are schematic block diagrams of a radio access node (e.g., a base station) in accordance with embodiments of the present disclosure.

FIG. 12 is a schematic block diagram of a radio access node 1200 according to some embodiments of the present disclosure. The radio access node 1200 may be, for example, a base station 1002 or 1006. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
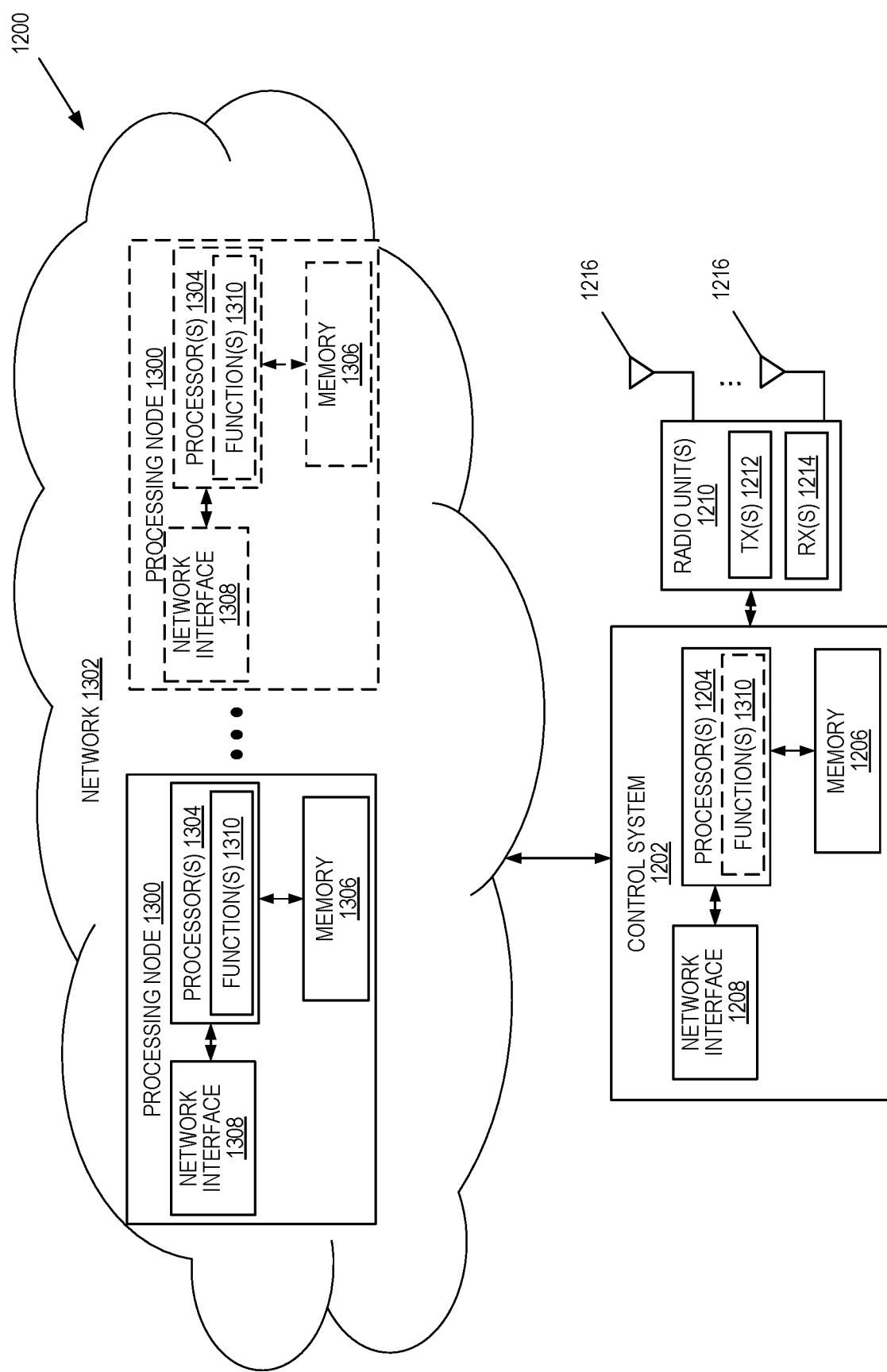

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
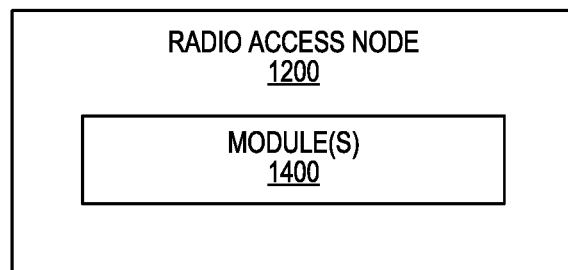

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
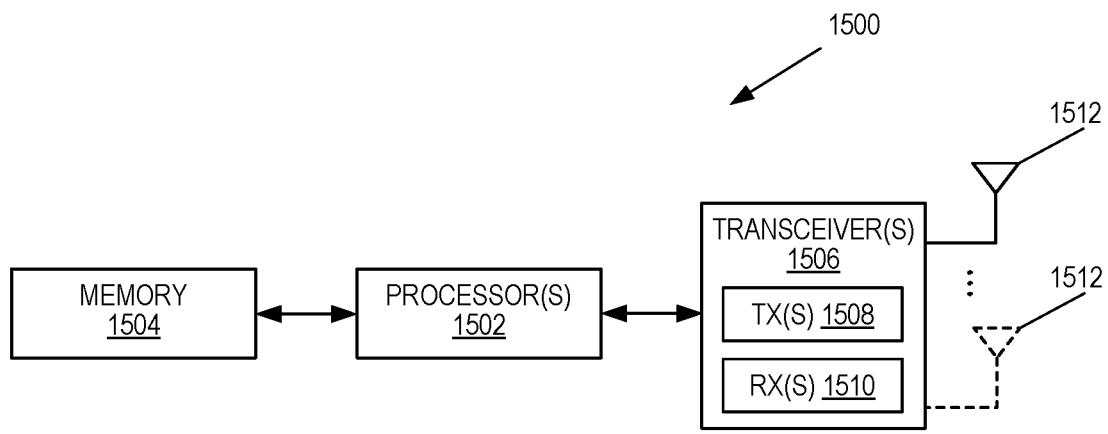
FIGS. 15 and 16 are schematic block diagrams of a wireless device in accordance with embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
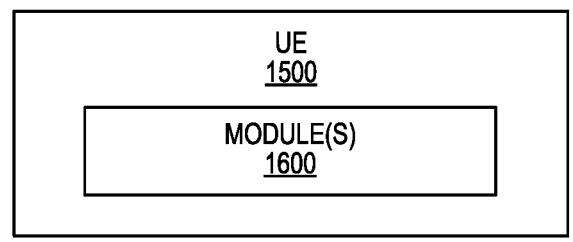

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
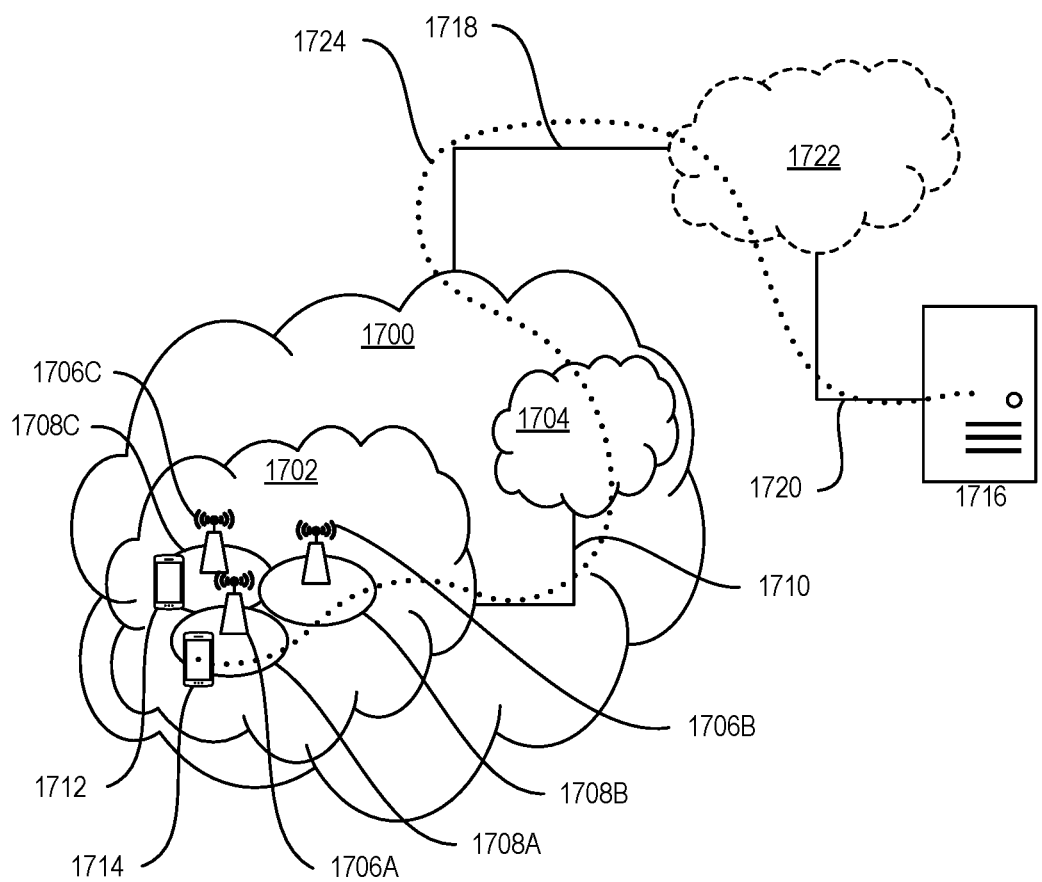
FIG. 17 illustrates an example of a communication system in which embodiments of the present disclosure may be implemented.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
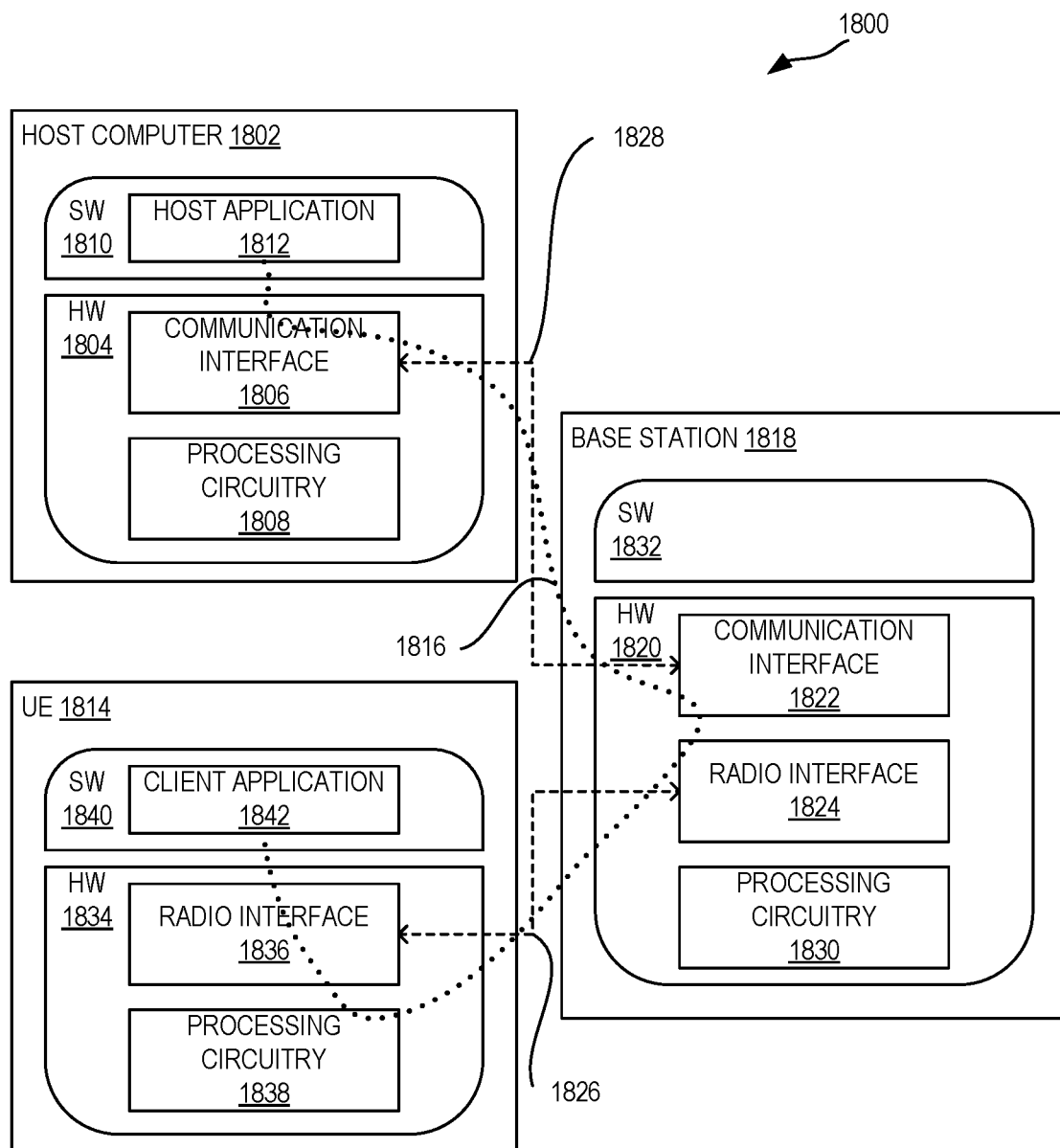
FIG. 18 illustrates the host computer, base station, and User Equipment (UE) of FIG. 17 in more detail in accordance with an embodiment of the present disclosure.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

Figures 19, 20:
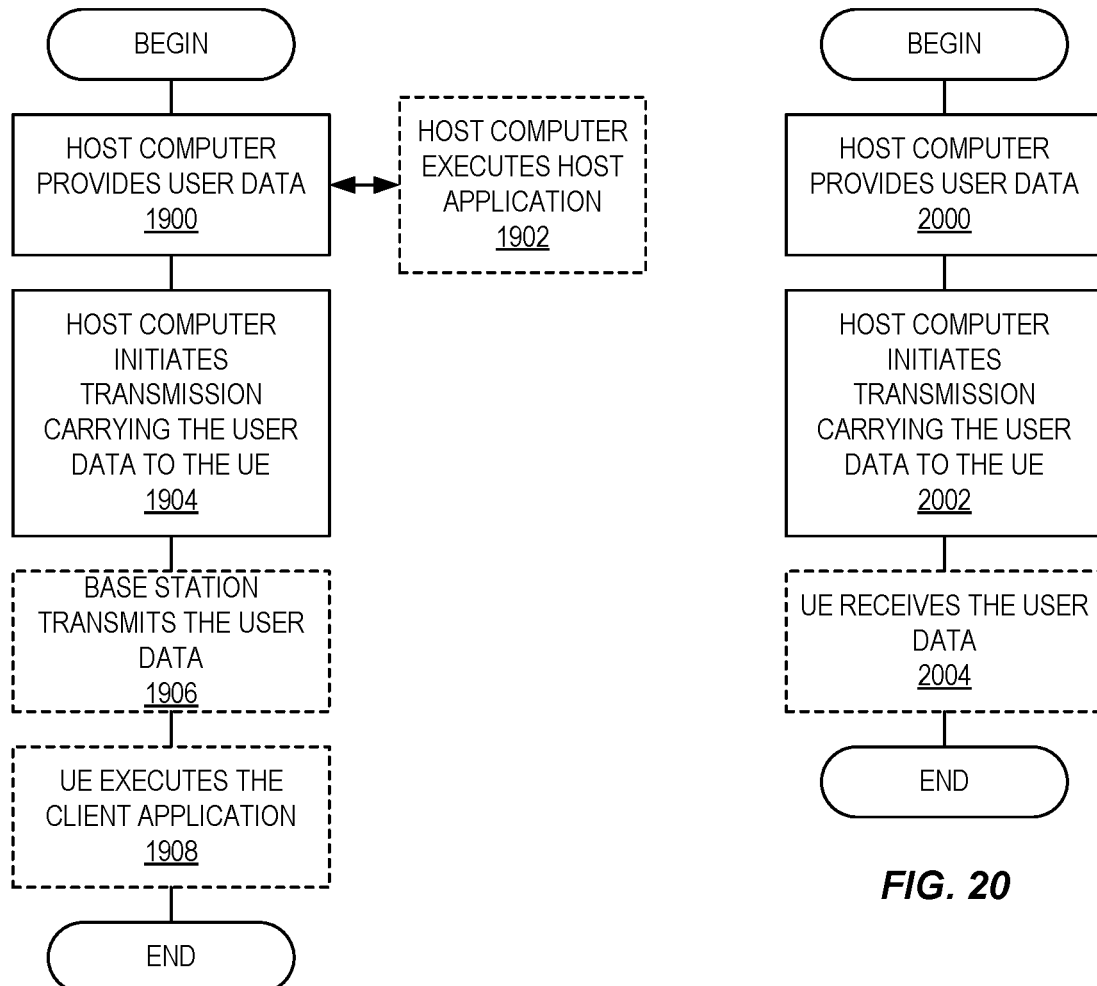

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

3 Discussion of Implementation of at Least Some Aspects of the Embodiments 3.1 Introduction In this section, we discuss open issues for PUSCH, PUCCH, and SRS design in 3GPP NR specifications, accounting for the guidance provided by RAN on essential features for NR-U. We also treat open issues for interlace design, since there is an unconfirmed working assumption from RAN1 AH 1901. In addition, we discuss the configurability of interlace transmission.

3.2 Interlace Design for PUSCH/PUCCH

In RAN1 AH 1901, the following agreement and working assumption were made regarding interlace design for PUSCH and PUCCH.

Agreement:
  For interlace transmission of at least PUSCH and PUCCH, the following PRB-based interlace design is supported for the case of 20 MHz carrier bandwidth:
    a. 15 kHz SCS: M=10 interlaces with N=10 or 11 PRBs/interlace
    b. 30 kHz SCS: M=5 interlaces with N=10 or 11 PRBs/interlace
  Note: PRACH design to be considered separately, including multiplexing aspects with PUSCH and PUCCH Working assumption:
  For a given SCS, the following interlace design is supported at least for PUSCH:
    Same spacing (M) between consecutive PRBs in an interlace for all interlaces regardless of carrier BW, i.e., the number of PRBs per interlace is dependent on the carrier bandwidth
    Point A is the reference for the interlace definition
    For 15 kHz SCS, M=10 interlaces and for 30 kHz SCS, M=5 interlaces for all bandwidths
    FFS: Interlace design for PUCCH for bandwidths greater than 20 MHz
    FFS: Whether and how partial interlace allocation is supported The above agreement is applicable to the interlace design for both PUSCH and PUCCH for 20 megahertz (MHz) carriers. The working assumption is more broad for the interlace design for PUSCH, in the sense that the same interlace design is supported regardless of carrier bandwidth, i.e., M=5/10 interlaces for 30/15 kilohertz (kHz) Subcarrier Spacing (SCS). This working assumption also states that Point A is the reference for the interlace definition. In our understanding, Point A is always the reference point for a carrier, regardless of carrier bandwidth; furthermore, Point A is configured on a per-carrier basis. While we do not object to this part of the agreement, it appears as though it does not add to or provide clarity to the design.

One important For Further Study (FFS) point in the working assumption is on the interlace design for PUCCH for carrier bandwidths greater than 20 MHz. Clearly, it is desirable to have a common design for both PUSCH and PUCCH for all carrier bandwidths; hence, we propose to confirm the working assumption with an amendment as follows:

Proposal 1: Confirm the working assumption from RAN1 AH 1901 on interlace design for PUSCH/PUCCH where the bullet "FFS: Interlace design for PUCCH for bandwidths greater than 20 MHz" is amended to "Support a common interlace design for PUSCH and PUCCH for all supported carrier bandwidths."

This still leaves FFS on whether/how partial interlace allocation is supported, and we discuss that further in Section 3.4.2 for PUSCH and Section 3.5.1 for PUCCH.

3.3 Configurability of Interlace Transmission for PUSCH/PUCCH

One aspect that has not yet been captured by formal agreements during the work item is the configurability of interlace transmission for PUSCH/PUCCH, i.e. configuring interlaced transmission to be either on or off. From the study item phase, the following text appears in 3GPP Technical Report (TR) 38.889, "Study on NR-based access to unlicensed spectrum," V16.0.0, December 2018:
  For scenarios in which a block-interlaced waveform is used for PUCCH/PUSCH, it has been identified that from FDM-based user-multiplexing standpoint it can be beneficial to have UL channels on a common interlace structure, at least for PUSCH, PUCCH, associated DMRS, and potentially PRACH
  On the other hand, for scenarios in which a contiguous allocation for PUSCH and PUCCH is used, it is beneficial to use contiguous resource allocation for PRACH Our understanding of this text is that both Release 15 (Rel-15) RA (contiguous) and interlaced allocation should be supported for PUSCH/PUCCH, and which one to select depends on the deployment scenario. Hence, we propose to formalize this in an agreement to make interlace transmission for PUSCH/PUCCH configurable.

One important aspect that needs to be considered is that PUSCH/PUCCH transmissions occur both prior to and after RRC connection establishment. Prior to RRC connection establishment, "default" configurations of PUSCH and PUCCH are provided to the UE. For example, a default PUCCH configuration is obtained by indication in System Information Block 1 (SIB1) of a row index into Table 9.2.1-1 in 3GPP Technical Specification (TS) 38.213. A default PUSCH configuration, e.g., for Message 3 (Msg3) transmission is provided in the Random Access Response (RAR), i.e. Msg2 (see Table 8.2-1 in 38.213). To enable interlace PUSCH/PUCCH transmission in these cases, the UE needs to receive prior indication of whether interlacing is enabled or disabled. Signaling this information in SIB1 is sufficient for this purpose.

After RRC connection establishment, the UE needs to know if interlacing is enabled/disabled for PUSCH/PUCCH transmissions on both the primary and secondary cells. Signaling this information by RRC is sufficient for this purpose. Such signaling would allow dedicated configuration of PUCCH resources and PUSCH transmission configuration.

To make the discussion more concrete, we propose to introduce a higher layer parameter InterlaceConfig which can take the values 'enabled' or 'disabled.' If InterlaceConfig='disabled,' the UE assumes Rel-15 non-interlace (contiguous) transmission for both PUSCH and PUCCH. To keep things relatively simple, we propose that such a parameter is global and applies to all PUSCH/PUCCH transmissions both prior to and subsequent to dedicated configuration. This includes the following:
  PUSCH
    Msg3 PUSCH scheduled by UL grant in RAR
    PUSCH scheduled by DCI 0_0 and 0_1
    PUSCH transmission according to Type 1 and Type 2 Configured Grants
  PUCCH
    PUCCH resource sets prior to dedicated configuration of PUCCH resources
    PUCCH resources sets after dedicated configuration of PUCCH resources Based on this, we propose the following:

Proposal 2: Support introduction of a higher layer, cell-specific parameter InterlaceConfig which takes the values 'enabled,' indicating interlaced PUSCH/PUCCH transmission, or 'disabled,' indicating legacy Rel-15 (non-interlaced) PUSCH/PUCCH transmission. For a Primary Cell (PCell), InterlaceConfig is provided to the UE via SIB1. For a Secondary Cell (SCell), InterlaceConfig is provided via dedicated (RRC) signaling. The configured value of InterlaceConfig is common to all serving cells for all PUSCH and PUCCH transmissions, both prior to after dedicated configuration.

For certain PUSCH/PUCCH transmissions, frequency hopping can be configured to be on/off in order to obtain frequency diversity. For interlace transmission, frequency hopping is not so relevant since the transmission spans a wide frequency, and thus frequency diversity is obtained for free. Hence, we propose the following:

Proposal 3: If InterlaceConfig='enabled,' frequency hopping is disabled for all PUSCH/PUCCH transmissions.

3.4 PUSCH Design

In the NR-U Work Item Description (WID) (see RP-182878, "New WID on NR-based Access to Unlicensed Spectrum," Qualcomm, RAN #82, December 2018), the following objective is listed related to PUSCH design:

UL data channel including extension of PUSCH to support PRB-based frequency block-interlaced transmission; support of multiple PUSCH(s) starting positions in one or multiple slot(s) depending on the LBT outcome with the understanding that the ending position is indicated by the UL grant; design not requiring the UE to change a granted TBS for a PUSCH transmission depending on the LBT outcome. The necessary PUSCH enhancements based on CP-OFDM. Applicability of sub-PRB frequency block-interlaced transmission for 60 kHz to be decided by RAN1.

In order to focus the work in RAN1, RAN provided guidance on essential functionality for NR-U (see RP-191581, "Guidance on essential functionality for NR-U," RAN, RAN #84, June 2019). Related to PUSCH design, the following guidance was provided:

Essential

Interlaced PUSCH resource allocation design in DCI

Optimizations

Multiple starting position within a PUSCH

60 KHz PUSCH interlaced waveform

Based on this guidance, we focus on the frequency domain RA for interlaced PUSCH in this section.

Regarding the item "Multiple starting position within a PUSCH," listed as an optimization in the above list, this is related to the following agreement from the study item phase (see 3GPP TR 38.889, Section 7.2.1.2):

The following options have been identified as possible candidate at least for the first PUSCH(s) transmitted in the UL transmission burst.

Option 1: PUSCH(s) as in Rel-15 NR

Option 2: Multiple starting positions in one or multiple slot(s) are allowed for PUSCH(s) scheduled by a single UL grant (i.e., not a configured grant) and one of the multiple PUSCH starting positions can be decided depending on LBT outcome.

It is noted that for above options, the ending position of the PUSCH is fixed as indicated by the UL grant.

It is noted that above options are not mutually exclusive. It is thus our understanding that RAN1. shall prioritize Option 1 in this agreement; hence we do not address Option 2 further. Moreover Option 1 does not require further RAN1 effort since legacy Rel-15 behavior is assumed.

3.4.1 Frequency Domain RA for Interlaced PUSCH

In this section, we discuss RA in the frequency domain for PUSCH, given that PUSCH can be transmitted using an interlace structure (see Section 3.3 on the configurability of interlacing). For interlace transmission, a mechanism is needed for indicating which interlaces are allocated to the UE for PUSCH transmission. In Rel-14 enhanced License Assisted Access (eLAA), one or more full interlaces are allocated for PUSCH transmission, and for NR-U it makes sense to support the same. One issue, however, is the remaining FFS on partial interlace allocation in the working assumption, motivated by the larger carrier bandwidths available in NR. We discuss partial interlace allocation in detail in the next section. Summarizing, if partial interlace allocation is needed, a simple PRB-level dynamic reserved resource indication mechanism can be used similar to that supported in the downlink for indicating that certain PRBs are not available for PUSCH transmission on the allocated full interlaces.

Figure 24:
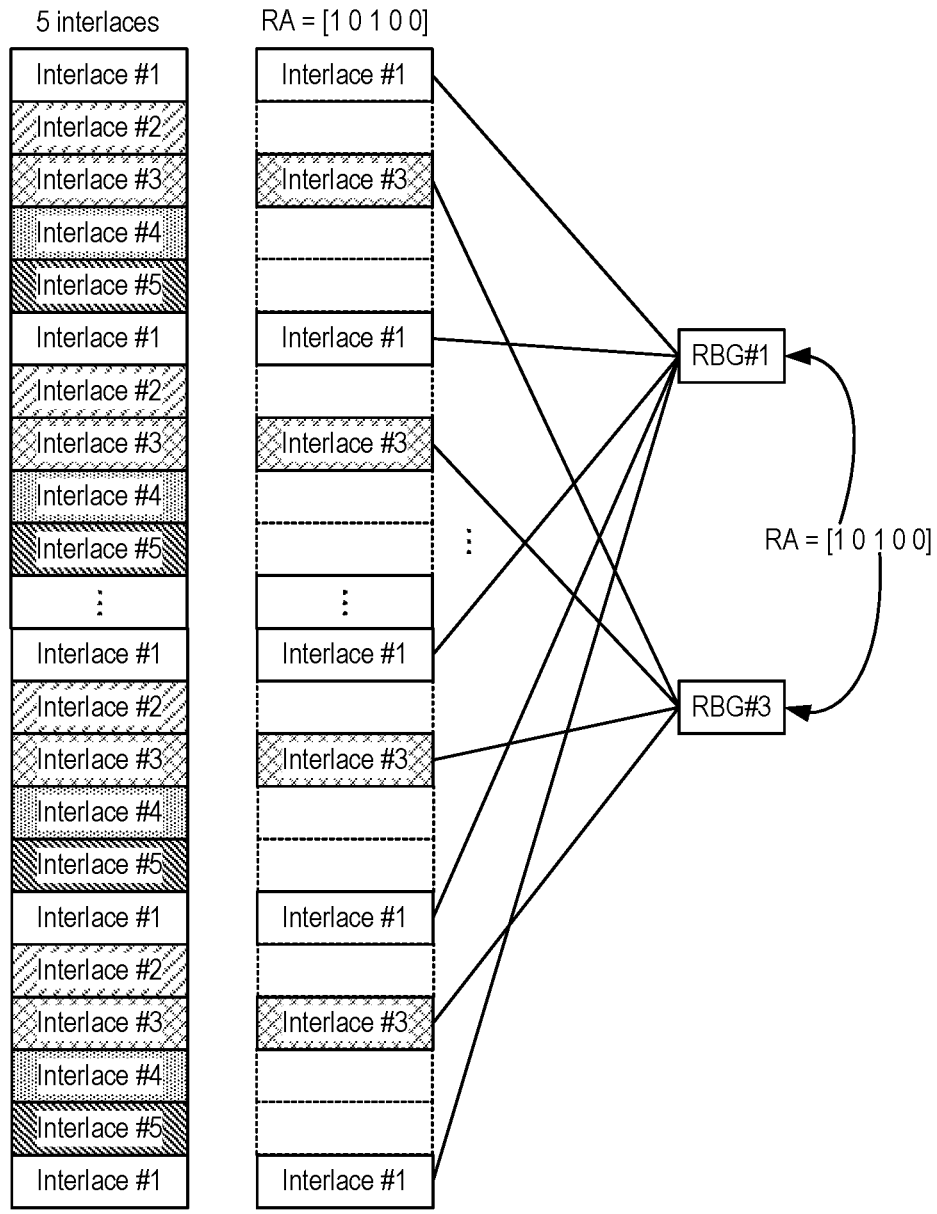
FIG. 24 illustrates an example of signaling a bitmap to signal a frequency domain Resource Allocation (RA), where each bit of the bitmap corresponds to an interlace index, in accordance with an embodiment of the present disclosure. In this manner, signaling of the bitmap flexibly indicates which interlaces are allocated.

As captured in the working assumption on interlace design (see Proposal 1 confirming the working assumption), the number of interlaces is fixed, regardless of carrier bandwidth. For 15 kHz SCS, the number of interlaces is M=10 and for 30 kHz SCS, the number of interlaces is M=5. Hence, to flexibly indicate which interlaces are allocated, one approach is to signal a bitmap of length 10 or 5 depending on if the SCS is 15 or 30 kHz SCS, respectively. FIG. 24 illustrates an example for the case of 30 kHz SCS using a length-5 bitmap. Each bit of the bitmap corresponds to an interlace index. In this example, the first and third bits are set indicating the first and third interlaces.

In order to establish if existing Rel-15 signaling can accommodate a length-10/5 bitmap for PUSCH for 15/30 kHz SCS, it is necessary to investigate the number of bits available for all methods by which PUSCH can be transmitted. Below we show that sufficient number of bits are indeed available, and hence propose to simply re-interpret a subset of the existing bits as a length-10/5 bitmap for interlace allocation. Such re-interpretation is done only if interlace allocation is configured, i.e. InterlaceConfig= 'enabled' as in Proposal 2. Otherwise, the frequency domain RA bits are interpreted as in Rel-15 for legacy (non-interlaced) PUSCH/PUCCH transmission.

In NR Rel-15, two RA types are defined:

Type 0: Non-contiguous allocation using a bitmap where each bit represents a Resource Block Group (RBG). The RBG size depends on the number of PRBs in the BWP, and Type 1: Contiguous allocation using RIV, which indicates a start Resource Block (RB) and a bandwidth (in RBs) within the BWP.

Either Type 0 or Type 1 or both can be configured. If both are configured, DCI indicates which one is used in any given scheduling instance.

PUSCH Scheduled by DCI 0_1 and DCI 0_0

The following is supported in NR Rel-15 for DCI indication of the RA type:

DCI format 0_1 supports indication of Type 0 or Type 1. If both are configured, then the Most Significant Bit (MSB) of the frequency domain resource assignment field in DCI indicates which type is used.

DCI format 0_0 supports only indication of Type 1.

Table 1 lists the number of bits provided by DCI for Type 0 and Type 1. These values are for the case of a 20 MHz carrier/BWP consisting of 106/51 PRBs for 15/30 kHz SCS. If both RA types are configured, the number of bits is one more than that shown in the table for Type 0. Configuration 1 and 2 in the table refer to the configurable RBG size for Type 0, e.g. 4 and 8, respectively, for the case of 51 PRBs. Note that for wider carrier bandwidths (>20 MHz), the number of bits provided by DCI scales as the number of PRBs increases, hence Table 1 can be viewed as a lower bound on the number of bits available.

TABLE 1

Number of bits provided by DCI for frequency domain RA Type 0 and Type 1 for the case of a 20 MHz BWP (106/51 PRBs for 15/30 kHz SCS). Configuration 1 and 2 refer to the nominal RBG size defined in in 38.214 Section 6.1.2.2.1.

| | RA Type 0 | | |
|---|---|---|---|
| SCS | Configuration 1 (Smaller RBG Size) | Configuration 2 (Larger RBG Size) | RA Type 1 |
| 15 kHz (106 PRBs) | 14 | 7 | 13 |
| 30 kHz (51 PRBs) | 13 | 7 | 11 |

PUSCH Transmission by Configured Grant Type 1 and 2

For Configured Grant (CG) Type 1 and 2 in Rel-15, the RA type is configured by RRC as for dynamic PUSCH, i.e. RA Type 0, RA Type 1, or both. For CG Type 1, the frequency domain RA is indicated by RRC, and is a fixed 18 bit field regardless of bandwidth (see the frequencyDomain-Allocation parameter in ConfiguredGrantConfigIE in 38.331). For CG Type 2, the RA it is indicated by the frequency domain resource assignment field in DCI as described above.

PUSCH Transmission According to UL Grant in RAR (Msg2)

For PUSCH transmissions according to the UL grant in RAR (Msg2), the number of bits used for indicating frequency domain RA is 14 as given by Table 8.2-1 in 3GPP TS 38.213:

TABLE 8.2-1

Random Access Response Grant Content field size

| RAR grant field | Number of bits |
|---|---|
| Frequency hopping flag | 1 |
| _PUSCH frequency resource allocation_ | _14_ |
| PUSCH time resource allocation | 4 |
| MCS | 4 |
| TPC command for PUSCH | 3 |
| CSI request | 1 |

Hence, as can be seen from the above analysis, there are a sufficient number of bits already available in Rel-15 to signal a 10/5 bit interlace allocation bitmap for 15/30 kHz SCS (see bolded and italicized text above). This is true regardless of how the frequency domain RA is signaled, i.e., by DCI, RRC, or MAC. Based on this we propose the following:

Proposal 4: If interlace transmission for PUSCH/PUCCH is configured (InterlaceConfig='enabled'), support frequency domain RA consisting of P full interlaces where $P \in \{1, 2, \ldots, M\}$ and M=10/5 for 15/30 kHz SCS. The interlace index combination is signaled with an Mbit bitmap, where each bit corresponds to one of the M interlaces. The UE obtains the bitmap by re-interpreting a subset of the M bits of existing Rel-15 frequency domain RA fields, regardless of the signaling mechanism, i.e. by DCI Format 0_0, 0_2 (dynamic UL grants), by RRC (configured UL grants), or by MAC (Msg3 UL grant in RAR).

3.4.2 Partial Interlace Allocation for PUSCH

As mentioned previously, there is still an FFS in the working assumption on whether/how partial interlace allocation is supported for PUSCH. It has been observed that for small PUSCH payloads, the minimum granularity of one full interlace may be too coarse. However, we observe that the following options exist for handling smaller payloads:

Observation 1 For handling small PUSCH payloads, either of the following approaches may be used to limit the time/frequency resource consumption, and thus provide fine scheduling granularity:
  a. Type-B PUSCH mappings may be used in combination with one full interlace
  b. Legacy Rel-15 (non-interlace) PUSCH transmission may be configured using Rel-15 RA Type 0/1

While the above approaches can cover a wide range of deployments, it may be desirable to utilize interlace mapping and still be able to allocate a partial interlace in some scenarios. Since these scenarios may constitute corner cases, partial interlace allocation should not be over-optimized. One simple approach to achieve partial interlace allocation, reusing existing Rel-15 functionality, is to support dynamic indication of PRB-level reserved resources in the uplink just like for the downlink.

For the downlink in Rel-15, there is an existing mechanism for dynamically indicating resources not available for PDSCH (see 3GPP TS 38.214 Section 5.1.4.1). The reserved resources in frequency and time are signaled via DCI using up to a 2-bit field in DCI Format 1_1 (see the following from 3GPP TS 38.212):

Rate matching indicator—0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.

The Rel-15 mechanism (configured in RateMatchPattern) is already very flexible with RB and symbol level bitmaps (resourceBlocks and symbolsInResourceBlock). In addition, periodicityAndPattern provides the possibility to configure a slot level repeating pattern. Such a mechanism could be reused in the uplink in order to indicate that a certain portion of one or more interlaces is not available for PUSCH transmission simply by configuring the PRB-level bitmap appropriately. In fact, such a mechanism could be useful in a variety of scenarios, even for non-interlaced transmission. Hence, we propose:

Proposal 5: For the uplink, support a rate matching mechanism similar to that in the Rel-15 downlink to indicate that PRBs/symbols are not available for PUSCH transmission according to one or more configured PRB- and symbol-level rate match pattern(s). For the case of PUSCH scheduled by DCI Format 0_1, support signaling of up to a [2]-bit rate matching indicator in DCI Format 0_1 for indicating one or more of the configured rate match pattern(s). FFS: Rate matching for PUSCH scheduled by other means, i.e. DCI 0_1, Msg3 PUSCH Grant in RAR, Configured Grants

3.5 PUCCH Design

In the NR-U WID (see RP-182878, "New WID on NR-based Access to Unlicensed Spectrum," Qualcomm, RAN #82, December 2018), the following objective is listed related to PUCCH design:
UL control including extension of PUCCH format(s) to support PRB-based frequency block-interlaced transmission and use of Rel-15 NR PUCCH formats 2 and 3 for NR-U operation. Applicability of sub-PRB frequency block-interlaced transmission for 60 kHz to be decided by RAN1.

The main aspect of the above WID objective states that extension of PUCCH format(s) to support PRB-based frequency block-interlaced transmission shall be specified. Relating to this, the following agreement was made at RAN1 #96:

Agreement #1:
Support short and long PUCCH durations based on enhancements of at least Rel-15 PUCCH formats PF2 and PF3. The enhancements include at least the following aspects:
For a 20 MHz carrier bandwidth, support mapping to physical resources of at least one full interlace
Mechanism to support user multiplexing for both data and reference symbols of PUCCH
The following aspects are FFS:
Support for small payloads (1 and 2 bits)
Alt-1: Support both small payloads and larger payloads (>2 bits) for enhanced PF2 and enhanced PF3
Alt-2: Small payloads are supported by enhanced PF0 and/or enhanced PF1
Whether or not to replace DFT-s-OFDM with CP-OFDM for the enhanced PF3

This agreement states that for a 20 MHz carrier bandwidth, at least Rel-15 PUCCH formats PF2 and PF3 are enhanced to support mapping to physical resources of at least one full interlace. The two FFS points were resolved in RAN1 #97 with the following two agreements:

Agreement #2:
Support enhancement of Rel-15 PUCCH formats PF0 and PF1 as follows:
Mapping to physical resources of one full interlace in 20 MHz.
FFS: Sequence type and mapping considering the following alternatives:
Alt-1: Repetition of the length-12 Rel-15 PF0 and PF1 sequence in each PRB of an interlace with mechanism to control PAPR/CM considering the following alternatives
Alt-1a: Cycling of cyclic shifts across PRBs
Alt-1b: Phase rotation across PRBs of an interlace where the phase rotation is can be per RE or per PRB
Alt-2: Mapping of different length-12 Rel-15 PF0 and PF1 sequences to the PRBs of an interlace based on different group number u (range is 0 . . . 29)
Alt-3: Mapping of a single long sequence to the PRBs of an interlace FFS: Impact due to guardbands
Note: Decisions on the above should be based on at least performance using the agreed MCL metric and specification impact
Note: Interlaced PF2 and 3 are not enhanced to support 1-2 bit payloads Agreement #3:
For enhanced Rel-15 PF3 supporting interlaced mapping, do not replace DFT-s-OFDM with CP-OFDM Based on these agreements, it is clear that the following open issues need to be treated:
Sequence type and mapping alternatives for interlaced PF0/1 as per Agreement #2
Mechanism to support user multiplexing for interlaced PF2/3 as per Agreement #1
PUCCH bandwidth configuration
The above agreements touch on PUCCH bandwidth; however, at least Agreement #2 is somewhat ambiguous considering prior agreements on interlace design These open issues are discussed in the following subsections.

3.5.1 PUCCH Bandwidth Configuration

In Agreement #1 above as it applies to carrier bandwidth of 20 MHz, allocation of at least one full interlace is already agreed. For such carriers, the transmission bandwidth is 51/106 PRBs for 30/15 kHz, and the agreed interlace design has 10 PRBs in an interlace (one or more interlaces may have 11 PRBs). Hence, the discussion on partial interlace allocation for PUCCH is only relevant for the case of carriers with wider transmission bandwidth.

The first sub-bullet in Agreement #2 above was meant to cover carriers with bandwidth 20 MHz and greater, i.e. transmission bandwidths 51/106 PRBs. Unfortunately, the statement in the agreement "Mapping to physical resources of one full interlace in 20 MHz" is somewhat ambiguous. For example, "one full interlace of an 80 MHz carrier spans approximately 80 MHz, so what does "in 20 MHz" mean in this context?

In our view, a more precise agreement on PUCCH bandwidth is needed to remove this ambiguity. Hence, we propose the following assuming the working assumption on interlace design is amended as in Proposal 4.

Proposal 6: If interlace transmission for PUSCH/PUCCH is configured (InterlaceConfig='enabled'), a PUCCH resource spans consecutive PRBs of one interlace within a BWP, where the interlace index is configurable. If the BWP spans less than 10 consecutive PRBs of the interlace, the PUCCH resource spans all PRBs of the interlace within the BWP. Otherwise, the number of PRBs shall not exceed 10, regardless of the bandwidth of the BWP/carrier.
FFS: Configurability of the starting PRB index within the configured interlace
FFS: Whether and how an interlaced PF2/3 resource can be configured on 2 interlaces to increase the number of allocated PRBs beyond 10.

This proposal effectively says that for a 20 MHz carrier, all 10 PRBs of one interlace are used (this is consistent with Agreement #1 above). For a carrier of bandwidth>20 MHz, a partial interlace is allocated to PUCCH, and the number of consecutive PRBs in the interlace is limited to 10 (this clarifies Agreement #2 above). The first FFS item is then meant to address where the partial allocation is located within the full interlace. The second FFS is meant to address whether or not the number of PRBs of a PF2/3 resource can be increased beyond 10 by occupying two interlaces instead of just one. We note that in Rel-15, PF2/3 can be configured with up to 16 PRBs. Hence, a limit of 10 reduces the maximum PUCCH payload size for interlaced PUCCH for NR-U. It can be further discussed if there are use cases that demand such large payloads.

In the above proposal, the frequency domain RA for the PUCCH is controlled by two parameters:
An interlace index, controlling which interlace out of the M=10/5 available interlaces is allocated
A starting PRB index within the allocated interlace
  This is only needed if the BWP spans more than 10 consecutive PRBs of the allocated interlace For PUCCH resources configured by RRC, it makes sense to include these parameters in the Information Element (IE) that configures the PUCCH resources, i.e. PUCCH-Config.

For PUCCH resources transmitted prior to dedicated RRC configuration on the other hand (e.g., for carrying Hybrid Automatic Repeat Request (HARQ) Acknowledgement (ACK)/Negative Acknowledgement (NACK) for Msg2), a default PUCCH configuration is used based on indication of a row index into Table 9.2.1-1 in 38.213 carried by SIB1 (integer value 0 . . . 15):

TABLE 9.2.1-1

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

For the case of legacy Rel-15 (non-interlaced) PUCCH resources, the PRB offset in the fifth column of this table indicates the PRB index of the single PRB occupied by the PF0/1 resource within the initial UL BWP. On the other hand, for the case of interlaced PF0/1, i.e. if SIB1 indicates InterlaceConfig='enabled' as per Proposal 2, the values in this column could simply be re-interpreted as an interlace index. The existing range of values in the table is sufficient since the initial UL BWP uses 30 kHz SCS for which there are only M=5 interlaces, meaning only values 0 . . . 4 are needed for the interlace indication. The value $\lfloor N_{BWP}^{size}/4 \rfloor$ in row 15 which can take values outside the range 0 . . . 4 could instead be mapped to a specific one of these five values.

Regarding a starting PRB index within the allocated interlace, we note that the initial UL BWP is the same size as the initial DL BWP, which was previously agreed to be 48 PRBs. Hence PUCCH will span the full BWP according to Proposal 10. For this reason, the starting PRB index is predetermined, and known to the UE, by the lowest PRB index of the allocated interlace within the initial UL BWP.

Proposal 7: If interlace transmission for PUSCH/PUCCH is configured (InterlaceConfig='enabled'), for interlaced PF0/1 transmitted prior to dedicated configuration, support indication of the allocated interlace with the existing values in the fifth column of Table 9.2.1-1 in 38.213. The UE re-interprets these values as the allocated interlace index.

3.5.2 Sequence Type and Mapping for Interlaced PF0/1

Figure 25:
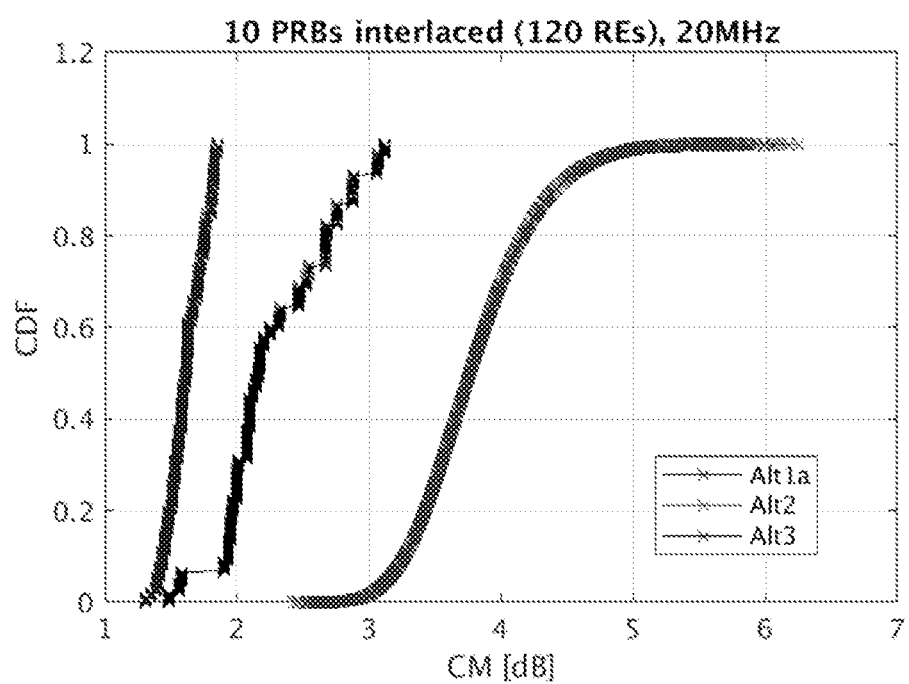
FIG. 25 illustrates a Cumulative Distribution Function (CDF) of the Cubic Metric (CM) for alternative sequences for interlaced PF0/PF1.

As shown in Agreement #2 above, interlace mapping for PUCCH Formats 0 and 1 was agreed in RAN1 #97, and the main open issue is to decide on the sequence type and mapping. In our companion paper (see R1-1909303, "Evaluation results Enhanced PUCCH and PRACH designs", Ericsson, RAN1 #98, August 2019), we provide a design analysis and evaluation of three of the alternatives. Here, we summarize our findings. The three alternatives that are evaluated for interlaced PF0 and PF1 on a 10 PRBs interlace for the case of 30 kHz SCS:
Alt-1a: 10× repetition of the length-12 Rel-15 CGS across the 10 PRBs of the interlace with cycling of cyclic shifts over the repetitions
Alt-2: 10 different length-12 Rel-15 CGS each corresponding to a different group number u in each PRB of the interlace
Alt-3: Mapping of a length-120 Zadoff-Chu (ZC) sequence to the 10 PRBs of the interlace FIG. 25 shows the Cumulative Distribution Function (CDF) of the Cubic Metric (CM) over the ensemble of available sequences (all cyclic shifts of all sequences based on u=0 . . . 29 and v=0) for each alternative. As can be seen, the CM for Alt-2 is much worse than for the other two alternatives. Because of this, simulations to derive Minimum Coupling Loss (MCL) for Alt-2 were not performed. Amongst the remaining two alternatives (Alt-1a vs. Alt-3), Alt-1a has a clear CM advantage of more than 1 decibel (dB) measured at the $95^{th}$ percentile.

Upon evaluating the performance in terms of maximum coupling loss under the agreed simulation assumptions, we find that Alt-1a and Alt-3 have similar MCL. However, it is important to point out that neither scheme requires backoff, since the total transmit power plus CM is still less than the maximum UE transmit power (23 dBm). In our view, it is important to think of forward compatibility as lower power class UEs become available. For the case of such UEs, the CM advantage of Alt-1a would become evident in the MCL, thus offering superior coverage. For this reason, we prefer Alt-1a.

Proposal 8: For interlaced PF0 and PF1, support Alt-1a in the RAN1 #97 agreement, i.e. repeat the Rel-15 length-12 CGS in each PRB of the interlace. The initial cyclic shift is configured for PF0 and PF1 resources as in Rel-15, and cyclic shifts are cycled over the PRBs of the interlace.

3.5.3 User Multiplexing for Interlaced PF2/3

As shown in Agreement #1 above, it was agreed in RAN1 #96 to support a mechanism for user multiplexing for interlaced PF2 and PF3. We point out that neither PF2 nor PF3 Rel-15 (non-interlaced) formats support user multiplexing today. Hence, any mechanism that is introduced will be new. However, we also note that PUCCH Format 4 in Rel-15 supports multiplexing of two and four users through the use of length-2 and length-4 Orthogonal Cover Codes (OCCs).

Furthermore, PF4 is just a special case of PF3 for the case of a single PRB. PF4 simply contains user multiplexing on top.

For this reason, in terms of the amount of RAN1 effort needed to introduce a user multiplexing, we think that the addition of user multiplexing to interlaced PF3 should be prioritized using the same mechanism as for PF4 in Rel-15, but just extended to the case of an interlaced mapping. Whether or not interlaced PF3 with user multiplexing can be called interlaced PF4 in the end can be further discussed. After completing the PF3 design, PF2 with user multiplexing can be considered if RAN1 can come to quick consensus on how to proceed.

With this strategy in mind, we present the design details and performance evaluation of interlaced PF3 and PF2 in our companion paper (see R1-1909303, "Evaluation results Enhanced PUCCH and PRACH designs", Ericsson, RAN1 #98, August 2019). In this paper we summarize our findings. The main aspect to consider when introducing user multiplexing is the performance in a frequency selective fading environment—the more users that are multiplexed, the more susceptible the performance is to channel dispersion.

3.5.3.1 Interlaced PF3

FIG. 26 shows the performance of the candidate E-PF3 PUCCH design in terms of MCL at different PUCCH payloads for the case of four and 14 OFDM symbols. Two different delay spread values are considered (10 and 100 nanoseconds (ns)). Different OCC mappings of length 1, 2, 4, and 6 (i.e., multiplexing of 1, 2, 4, and 6 users). We note that in Rel-15, OCC lengths 2 and 4 are supported for PF4. While length-6 was discussed during Rel-15 it was not agreed.

Clearly, as the PUCCH duration is increased, the MCL increases, which translates to improved coverage. For example, for the lighter-shaded curves at low payload, the increase from 4 to 14 OFDM symbol duration is roughly 5 dB corresponding to a ratio 14:4 in increased energy collection.

As can be seen from FIG. 26, multiplexing of up to six users can be supported with only a moderate performance degradation. One can see that the short (four symbol) PUCCH is more sensitive to dispersion than the longer duration PUCCH. This suggests that the short PUCCH is suitable for lower dispersion and lower levels of user multiplexing, whereas the longer PUCCH durations are more suitable for higher dispersion and higher levels of user multiplexing.

Proposal 9: Interlaced PUCCH format PF3 is further enhanced to support multiplexing of at least two and four users. FFS: Whether or not this can be considered as interlaced PF4.

3.5.3.2 Interlaced PF2

Figure 27:
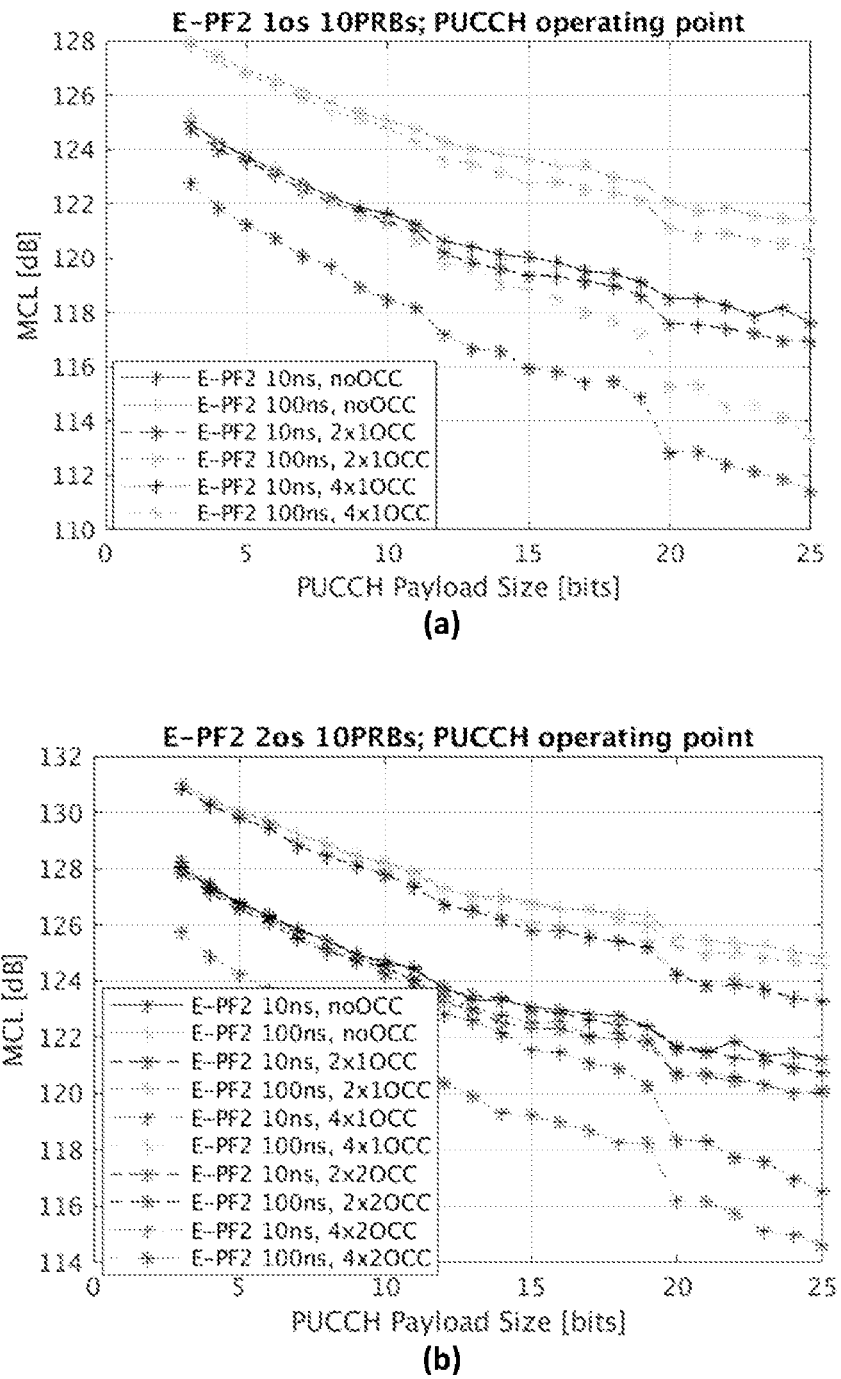
FIG. 27 illustrates performance of candidate E-PF2 PUCCH design (using PN-sequences, new random sequence per block) for (a) one (1) OFDM symbol and (b) two (2) OFDM symbols.

FIG. 27 shows the performance of the candidate E-PF2 PUCCH design in terms of MCL at different PUCCH payloads for the case of one and two OFDM symbols. Two different delay spread values are considered (10 and 100 ns).

In FIG. 27, performance is shown for simulations with one UE with different OCC mappings. The mappings are on the form A×B, where A is the intra symbol OCC length and B is the inter symbol OCC length.

As can be seen, for one symbol PF2, multiplexing of two users is feasible; however, multiplexing of four users leads to significant degradation in performance due to a loss of orthogonality between the OCCs due to channel dispersion. However, for two symbol PF2, multiplexing of four users is feasible, either through OCC length 4 in the frequency domain or OCC length 2 in both the time and frequency domains. Support for eight user multiplexing (4×2 OCC) is not feasible.

Proposal 10: Time permitting, interlaced PUCCH format PF2 is further enhanced to support multiplexing of at most two users for single symbol PF2 and at most four users for two symbol PF2.

As discussed in our companion paper (see R1-1909303, "Evaluation results Enhanced PUCCH and PRACH designs", Ericsson, RAN1 #98, August 2019), the application of OCC codes in the frequency domain to support user multiplexing can, if not mitigated by some means, lead to a degradation (increase) in both Peak-to-Average Power Ratio (PAPR) and CM due to the necessary repetition of the data symbols before application of the OCCs. We suggest a simple approach to mitigate PAPR degradation in which each user cycles through all OCCs codes across the frequency domain to break up the repetition pattern. The cycling pattern is chosen such that for any given PRB, all multiplexed users use different OCCs. Table 4 in our companion paper (see R1-1909303, "Evaluation results Enhanced PUCCH and PRACH designs", Ericsson, RAN1 #98, August 2019) shows significant improvement with OCC cycling, in the range 2-5 dB depending on the OCC length. Based on these results we propose the following:

Proposal 11 If interlaced PF2 is further enhanced to support user multiplexing, support OCC cycling to minimize the PAPR/CM of the transmitted time domain waveform.

3.6 SRS Design

In the NR-U WID (RP-182878), the following objective is listed related to SRS design:

SRS including the introduction of additional flexibility in configuring/triggering SRS in line with agreements during the study phase.

which refers to the following candidate enhancements listed in the NR-U TR (3GPP TR 38.889)

The following candidate enhancements have been discussed; design details can be further discussed when specifications are developed:

Additional OFDM symbol locations for an SRS resource within a slot other than the last 6 symbols Interlaced waveform Additional flexibility in frequency domain configuration Based on the guidance provided by RAN in the last plenary meeting, interlaced waveform for SRS has been deprioritized, so will not be considered here further.

One SRS topic that still deserves attention for operation in unlicensed spectrum is the triggering mechanism for SRS in Rel-15. Generally speaking, the use of periodic and semi-persistent reference signals, e.g. SRS in the UL and CSI-RS in the DL, is not well-suited to operation in unlicensed spectrum due to uncertainties in accessing the channel when applying Listen-Before-Talk (LBT). If LBT fails prior to a particular period, then that period must be dropped, thus reducing the utility of these reference signals for their designed purpose to enable channel sounding and tracking. Furthermore, due to the asynchronous nature of channel access, it is fundamentally impossible to pre-configure a periodic/semi-persistent SRS transmission such that each period aligns with a gNB acquired Channel Occupancy Time (COT) in order to make use of Cat1 or Cat2 LBT for SRS.

For this reason, aperiodic triggering of SRS is much better suited to operation in unlicensed bands, as it is easy to align transmissions within a shared COT acquired by the gNB. SRS can be aperiodically triggered for immediate transmission after a short hardware turnaround time in a shared COT. Alternatively, SRS can be time division multiplexed with zero gap after a PUSCH transmission in a shared COT.

Observation 2: Aperiodic SRS transmission is most suitable for NR-U.

While SRS is supported already in NR Rel-15, there is room for improvement in the configuration and triggering process that would make them even better suited to operation in unlicensed spectrum.

In Rel-15, when a set of SRS resources is configured by RRC, a slot offset k is configured as part of the set configuration. Based on this preconfigured offset, if the PDCCH that triggers the aperiodic SRS is transmitted in slot n, then the SRS resource(s) in the set are actually transmitted in slot n+k. Since there are only a limited number of DCI codepoints in the 2-bit SRS request field in DCI for triggering SRS resource sets, there are only a limited number of triggering possibilities that can be preconfigured. In unlicensed operation, which is effectively based on dynamic Time Division Duplexing (TDD) operation, there is no deterministic pattern for which slots/symbols are classified as UL (for which SRS may be transmitted) and which ones are classified as DL. Hence such rigid configuration of slot offsets imposes undesirable constraints on when PDCCH must be transmitted for triggering aperiodic SRS.

We note that such rigid configuration of slot offsets is less flexible than SRS triggering in LTE. In LTE, one may trigger an SRS, and the next available UL opportunity for SRS transmission is used, rather than a specific slot offset with respect to the PDCCH trigger. In our view, for unlicensed operation, it is desirable to re-introduce such LTE-like behavior for SRS triggering. Introducing this behavior is quite simple—no change is needed to the RRC configuration of slot offsets. Instead, the specification of UE behavior is modified such that the UE interprets the slot offset as a lower bound on triggering delay. If this lower bound happens to coincide with a slot/symbols available for UL transmission, then the SRS is transmitted. Otherwise the SRS is transmitted in the next slot/symbols available for UL transmission. Based on this we propose the following:

Proposal 12: For a set of aperiodic SRS resources with slot offset configured as k slots, support SRS transmission in slot n+k+$\Delta$, where n indexes the slot in which the PDCCH containing the SRS trigger is received, and $\Delta$ is the smallest integer larger than 0 such that the OFDM symbols of the SRS resources in the set coincide with OFDM symbols available for UL transmission.

4 Example Embodiments

Some example embodiments of the present disclosure are as follows:

Group A Embodiments

Embodiment 1: A method performed by a wireless device, the method comprising: receiving (1100) a frequency domain interlace allocation for a transmission, the transmission being either a transmission to the wireless device or a transmission from the wireless device, and the frequency domain interlace allocation comprising an Interlace Block Group, IBG, indicator and an interlace indicator.

Embodiment 2: The method of embodiment 1 wherein: M interlaces (where M>1) are defined for a bandwidth part or carrier on which the transmission is allocated; and the bandwidth part or carrier bandwidth on which the transmission is allocated is (e.g., logically) divided, in the frequency domain, into two or more IBGs.

Embodiment 2A: The method of embodiment 2 wherein each IBG consists of K IBs.

Embodiment 2B: The method of embodiment 2 wherein each IBG consists of up to K IBs.

Embodiment 2C: The method of embodiment 2B wherein the two or more IBGs comprise one or more full IBGs each consisting of K IBs and a partial IBG consisting of at least one PRB.

Embodiment 2D: The method of embodiment 2 wherein each IBG consists of at least K IBs.

Embodiment 2E: The method of embodiment 2D wherein the two or more IBGs comprise one or more full IBGs each consisting of K IBs and an extended IBG consisting of more than M PRBs.

Embodiment 2F: The method of any one of embodiments 2A to 2E wherein each IB consists of up to M>1 contiguous physical resource blocks, PRBs, in the frequency domain.

Embodiment 2G: The method of embodiment 2F wherein at least one IB in at least one of the two or more IBGs is a partial IB comprising less than M contiguous PRBs in the frequency domain.

Embodiment 2H: The method of embodiment 2G wherein all remaining IBs of the at least one of the two or more IBGs and all IBs of all of the other IBGs from among the two or more IBGs are full IBs each consisting of M contiguous PRBs in the frequency domain.

Embodiment 2I: The method of any one of embodiments 2A to 2E wherein each IB consists of at least M>1 contiguous physical resource blocks, PRBs, in the frequency domain.

Embodiment 2J: The method of embodiment 2I wherein at least one IB in at least one of the two or more IBGs is an extended IB comprising more than M contiguous PRBs in the frequency domain.

Embodiment 2K: The method of embodiment 2J wherein all remaining IBs of the at least one of the two or more IBGs and all IBs of all of the other IBGs from among the two or more IBGs are full IBs each consisting of M contiguous PRBs in the frequency domain.

Embodiment 3: The method of any one of embodiments 2 to 2K wherein the IBG indicator indicates one or more IBGs from among the two or more IBGs that are allocated for the transmission.

Embodiment 4: The method of embodiment 3 wherein the interlace indicator indicates, from among the M interlaces, one or more interlaces that are allocated for the transmission within the K IBs in at least one of (e.g., each of) the one or more IBGs indicated by the IBG indicator.

Embodiment 5: The method embodiment 3 or 4 wherein the IBG indicator comprises information that indicates a starting IBG index and a length, wherein the length is a number of IBGs.

Embodiment 6: The method of embodiment 3 or 4 wherein the IBG indicator comprises an IBG resource indicator value that jointly encodes a starting IBG index and a length.

Embodiment 7: The method of embodiment 3 or 4 wherein the IBG indicator comprises a bitmap, wherein each n-th position in the bitmap indicates whether a respective IBG from among the two or more IBGs is allocated for the transmission.

Embodiment 8: The method embodiment 3 or 4 wherein the IBG indicator comprises an index to a table of predefined IBG combinations.

Embodiment 9: The method embodiment 3 or 4 wherein the IBG indicator comprises a list of IBG indices.

Embodiment 10: The method of any one of embodiments 4 to 9 wherein the interlace indicator comprises a bitmap wherein each m-th position in the bitmap indicates whether a respective interlace from among the M interlaces is allocated for the transmission.

Embodiment 11: The method of any one of embodiments 4 to 9 wherein the interlace indicator comprises an index to a table of predefined interlace index combinations.

Embodiment 12: The method of any one of embodiments 4 to 9 wherein the interlace indicator comprises a list of interlace indices.

Embodiment 13: The method of any one of embodiments 3 to 12 wherein at least one of the two or more IBGs consists of a non-integer number of IBs but an integer number of PRBs.

Embodiment 14: The method of embodiment 13 wherein a particular IBG from among the two or more IBGs consists of a number of contiguous PRBs with a lowest PRB index i and a highest PRB index j, wherein j>i.

Embodiment 15: The method of embodiment 14 wherein the index i and the index j correspond to a particular sub-band or the bandwidth part or carrier in which LBT operation is performed.

Embodiment 16: The method of embodiment 15 further comprising receiving indications of the index i and the index j via higher layer signaling.

Embodiment 17: The method of any one of embodiments 1 to 16 wherein receiving (1100) the frequency domain interlace allocation for the transmission comprises receiving the IBG indicator and the interlace indicator via one or more of: dynamically via DCI signaling; dynamically via MAC CE signaling; and semi-statically via higher layer signaling (e.g., RRC signaling).

Embodiment 18: The method of any one of embodiments 1 to 17 wherein the transmission is one or more of: a PUSCH transmission; a PUCCH transmission; a SRS transmission; and a PRACH transmission.

Embodiment 19: The method of any one of embodiments 1 to 17 wherein the transmission is one or more of: a PDSCH transmission; a PDCCH transmission; and a CSI-RS transmission.

Embodiment 20: The method of any one of embodiments 1 to 19 further comprising receiving a reserved resource indicator that refers to a plurality of pre-configured reserved resource patterns each indicating at least which PRBs from among PRBs allocated by the IBG indicator and the interlace indicator(s) are not available or are available for the transmission.

Embodiment 21: The method of embodiment 20 wherein at least one or more of the reserved resource patterns comprises a bitmap where the i-th position of the bitmap indicates whether a respective PRB is available or is not available.

Embodiment 22: The method of embodiment 20 wherein at least one or more of the reserved resource patterns comprises a bitmap where the j-th position of the bitmap indicates whether all PRBs within a respective IB are available or are not available.

Embodiment 23: The method of embodiment 20 wherein the reserved resource pattern comprises a list of PRB indices.

Embodiment 24: The method of embodiment 20 wherein the reserved resource pattern comprises a list of IB indices.

Embodiment 24a: The method of embodiment 20 wherein the reserved resource pattern comprises a list of IBG indices.

Embodiment 25: The method of any one of embodiments 20 to 24 wherein receiving the reserved resource indicator comprises receiving the reserved resource indicator via: dynamic signaling (e.g., via DCI or via MAC CE), or semi-static signaling (e.g., via higher layer signaling such as, e.g., RRC signaling), or a combination of dynamic signaling and semi-static signaling.

Embodiment 26: The method of any one of embodiments 20 to 24 wherein receiving the reserved resource indicator comprises receiving the reserved resource indicator via DCI, the DCI being a DCI used for scheduling uplink resources (e.g., DCI 0_0 or 0_1).

Embodiment 27: The method of any of the previous embodiments, further comprising: providing user data; and forwarding the user data to a host computer via the transmission to the base station.

Group B Embodiments

Embodiment 28: A method performed by a base station, the method comprising: transmitting (1100), to a wireless device, a frequency domain interlace allocation for a transmission, the transmission being either a transmission to the wireless device or a transmission from the wireless device, and the frequency domain interlace allocation comprising an Interlace Block Group, IBG, indicator and an interlace indicator.

Embodiment 29: The method of embodiment 28 wherein: M interlaces (where M>1) are defined for a bandwidth part or carrier on which the transmission is allocated; and the bandwidth part or carrier bandwidth on which the transmission is allocated is (e.g., logically) divided, in the frequency domain, into two or more IBGs.

Embodiment 29A: The method of embodiment 29 wherein each IBG consists of K IBs.

Embodiment 29B: The method of embodiment 29 wherein each IBG consists of up to K IBs.

Embodiment 29C: The method of embodiment 29B wherein the two or more IBGs comprise one or more full IBGs each consisting of K IBs and a partial IBG consisting of at least one PRB.

Embodiment 29D: The method of embodiment 29 wherein each IBG consists of at least K IBs.

Embodiment 29E: The method of embodiment 29D wherein the two or more IBGs comprise one or more full IBGs each consisting of K IBs and an extended IBG consisting of more than M PRBs.

Embodiment 29F: The method of any one of embodiments 29A to 29E wherein each IB consists of up to M>1 contiguous physical resource blocks, PRBs, in the frequency domain.

Embodiment 29G: The method of embodiment 29F wherein at least one IB in at least one of the two or more IBGs is a partial IB comprising less than M contiguous PRBs in the frequency domain.

Embodiment 29H: The method of embodiment 29G wherein all remaining IBs of the at least one of the two or more IBGs and all IBs of all of the other IBGs from among the two or more IBGs are full IBs each consisting of M contiguous PRBs in the frequency domain.

Embodiment 29I: The method of any one of embodiments 29A to 29E wherein each IB consists of at least M>1 contiguous physical resource blocks, PRBs, in the frequency domain.

Embodiment 29J: The method of embodiment 29I wherein at least one IB in at least one of the two or more IBGs is an extended IB comprising more than M contiguous PRBs in the frequency domain.

Embodiment 29K: The method of embodiment 29J wherein all remaining IBs of the at least one of the two or more IBGs and all IBs of all of the other IBGs from among the two or more IBGs are full IBs each consisting of M contiguous PRBs in the frequency domain.

Embodiment 30: The method of any one of embodiments 29 to 29K wherein the IBG indicator indicates one or more IBGs from among the two or more IBGs that are allocated for the transmission.

Embodiment 31: The method of embodiment 30 wherein the interlace indicator indicates, from among the M interlaces, one or more interlaces that are allocated for the transmission within the K IBs in at least one of (e.g., each of) the one or more IBGs indicated by the IBG indicator.

Embodiment 32: The method embodiment 30 or 31 wherein the IBG indicator comprises information that indicates a starting IBG index and a length.

Embodiment 33: The method of embodiment 30 or 31 wherein the IBG indicator comprises an IBG resource indicator value that jointly encodes a starting IBG index and a length.

Embodiment 34: The method embodiment 30 or 31 wherein the IBG indicator comprises a bitmap, wherein each n-th position in the bitmap indicates whether a respective IBG from among the two or more IBGs is allocated for the transmission.

Embodiment 35: The method embodiment 30 or 31 wherein the IBG indicator comprises an index to a table of predefined IBG combinations.

Embodiment 36: The method embodiment 30 or 31 wherein the IBG indicator comprises a list of IBG indices.

Embodiment 37: The method of any one of embodiments 31 to 36 wherein the interlace indicator comprises a bitmap wherein each m-th position in the bitmap indicates whether a respective interlace from among the M interlaces is allocated for the transmission.

Embodiment 38: The method of any one of embodiments 31 to 36 wherein the interlace indicator comprises an index to a table of predefined interlace index combinations.

Embodiment 39: The method of any one of embodiments 31 to 36 wherein the interlace indicator comprises a list of interlace indices.

Embodiment 40: The method of any one of embodiments 30 to 39 wherein at least one of the two or more IBGs consists of a non-integer number of IBs but an integer number of PRBs.

Embodiment 41: The method of embodiment 40 wherein a particular IBG from among the two or more IBGs consists of a number of contiguous PRBs with a lowest PRB index i and a highest PRB index j, wherein j>i.

Embodiment 42: The method of embodiment 41 wherein the index i and the index j correspond to a particular sub-band or the bandwidth part or carrier in which LBT operation is performed.

Embodiment 43: The method of embodiment 42 further comprising receiving indications of the index i and the index j via higher layer signaling.

Embodiment 44: The method of any one of embodiments 28 to 43 wherein transmitting (1100) the frequency domain interlace allocation for the transmission comprises transmitting the IBG indicator and the interlace indicator via one or more of: dynamically via DCI signaling; dynamically via MAC CE signaling; and semi-statically via higher layer signaling (e.g., RRC signaling).

Embodiment 45: The method of any one of embodiments 28 to 44 wherein the transmission is one or more of: a PUSCH transmission; a PUCCH transmission; a SRS transmission; and a PRACH transmission.

Embodiment 46: The method of any one of embodiments 28 to 44 wherein the transmission is one or more of: a PDSCH transmission; a PDCCH transmission; and a CSI-RS transmission.

Embodiment 47: The method of any one of embodiments 28 to 46 further comprising transmitting a reserved resource indicator that refers to a plurality of pre-configured reserved resource patterns each indicating at least which PRBs from among PRBs allocated by the IBG indicator and the interlace indicator(s) are not available or are available for the transmission.

Embodiment 48: The method of embodiment 47 wherein at least one or more of the reserved resource patterns comprises a bitmap where the i-th position of the bitmap indicates whether a respective PRB is available or is not available.

Embodiment 49: The method of embodiment 47 wherein at least one or more of the reserved resource patterns comprises a bitmap where the j-th position of the bitmap indicates whether all PRBs within a respective IB are available or are not available.

Embodiment 50: The method of embodiment 47 wherein the reserved resource pattern comprises a list of PRB indices.

Embodiment 51: The method of embodiment 47 wherein the reserved resource pattern comprises a list of IB indices.

Embodiment 51a: The method of embodiment 47 wherein the reserved resource pattern comprises a list of IBG indices.

Embodiment 52: The method of any one of embodiments 47 to 51 wherein transmitting the reserved resource indicator comprising signaling the reserved resource indicator to the wireless: dynamically (e.g., via DCI or via MAC CE), or semi-statically (e.g., via higher layer signaling such as, e.g., RRC signaling), or a combination of dynamic signaling and semi-static signaling.

Embodiment 53: The method of any one of embodiments 47 to 51 wherein transmitting the reserved resource indicator comprising signaling the reserved resource indicator to the wireless via DCI, the DCI being a DCI used for scheduling uplink resources (e.g., DCI 0_0 or 0_1).

Embodiment 54: The method of any of the previous embodiments, further comprising: obtaining user data; and forwarding the user data to a host computer or a wireless device.

Group C Embodiments

Embodiment 55: A wireless device comprising: processing circuitry configured to perform any of the steps of any of the Group A embodiments; and power supply circuitry configured to supply power to the wireless device.

Embodiment 56: A base station comprising: processing circuitry configured to perform any of the steps of any of the Group B embodiments; and power supply circuitry configured to supply power to the base station.

Embodiment 57: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 58: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 59: The communication system of the previous embodiment further including the base station.

Embodiment 60: The communication system of the previous 2 embodiments, further including the UE, wherein the UE is configured to communicate with the base station.

Embodiment 61: The communication system of the previous 3 embodiments, wherein: the processing circuitry of the host computer is configured to execute a host application, thereby providing the user data; and the UE comprises processing circuitry configured to execute a client application associated with the host application.

Embodiment 62: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 63: The method of the previous embodiment, further comprising, at the base station, transmitting the user data.

Embodiment 64: The method of the previous 2 embodiments, wherein the user data is provided at the host computer by executing a host application, the method further comprising, at the UE, executing a client application associated with the host application.

Embodiment 65: A User Equipment, UE, configured to communicate with a base station, the UE comprising a radio interface and processing circuitry configured to perform the method of the previous 3 embodiments.

Embodiment 66: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 67: The communication system of the previous embodiment, wherein the cellular network further includes a base station configured to communicate with the UE.

Embodiment 68: The communication system of the previous 2 embodiments, wherein: the processing circuitry of the host computer is configured to execute a host application, thereby providing the user data; and the UE's processing circuitry is configured to execute a client application associated with the host application.

Embodiment 69: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 70: The method of the previous embodiment, further comprising at the UE, receiving the user data from the base station.

Embodiment 71: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 72: The communication system of the previous embodiment, further including the UE.

Embodiment 73: The communication system of the previous 2 embodiments, further including the base station, wherein the base station comprises a radio interface configured to communicate with the UE and a communication interface configured to forward to the host computer the user data carried by a transmission from the UE to the base station.

Embodiment 74: The communication system of the previous 3 embodiments, wherein: the processing circuitry of the host computer is configured to execute a host application; and the UE's processing circuitry is configured to execute a client application associated with the host application, thereby providing the user data.

Embodiment 75: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 76: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 77: The method of the previous embodiment, further comprising, at the UE, providing the user data to the base station.

Embodiment 78: The method of the previous 2 embodiments, further comprising: at the UE, executing a client application, thereby providing the user data to be transmitted; and at the host computer, executing a host application associated with the client application.

Embodiment 79: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 80: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 81: The communication system of the previous embodiment further including the base station.

Embodiment 82: The communication system of the previous 2 embodiments, further including the UE, wherein the UE is configured to communicate with the base station.

Embodiment 83: The communication system of the previous 3 embodiments, wherein: the processing circuitry of the host computer is configured to execute a host application; and the UE is configured to execute a client application associated with the host application, thereby providing the user data to be received by the host computer.

Embodiment 84: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 85: The method of the previous embodiment, further comprising at the base station, receiving the user data from the UE.

Embodiment 86: The method of the previous 2 embodiments, further comprising at the base station, initiating a transmission of the received user data to the host computer.

Group D

Embodiment 87: A method performed by a wireless device, the method comprising: receiving a reserved resource indicator that refers to a plurality of pre-configured uplink reserved resource patterns each indicating at least which subset of uplink Physical Resource Blocks, PRBs, from among a set of allocated uplink PRBs are not available or are available for uplink transmission.

Embodiment 88: The method of embodiment 87 further comprising: receiving (1100) a frequency domain interlace allocation for the uplink transmission, the frequency domain interlace allocation comprising an interlace indicator that indicates the set of allocated uplink PRBs.

Embodiment 89: The method of embodiment 88 wherein: M interlaces (where M>1) are defined for a bandwidth part or carrier on which the uplink transmission is allocated; and the bandwidth part or carrier bandwidth on which the uplink transmission is allocated is (e.g., logically) divided, in the frequency domain, into one or more Interlace Block Groups (IBGs).

Embodiment 90: The method of embodiment 89 wherein each IBG consists of K IBs.

Embodiment 91: The method of embodiment 89 wherein each IBG consists of up to K IBs.

Embodiment 92: The method of embodiment 91 wherein the one or more IBGs comprise one or more full IBGs each consisting of K IBs and a partial IBG consisting of at least one PRB.

Embodiment 93: The method of embodiment 89 wherein each IBG consists of at least K IBs.

Embodiment 94: The method of embodiment 93 wherein the one or more IBGs comprise one or more full IBGs each consisting of K IBs and an extended IBG consisting of more than M PRBs.

Embodiment 95: The method of any one of embodiments 90 to 94 wherein each IB consists of up to M contiguous physical resource blocks, PRBs, in the frequency domain.

Embodiment 96: The method of embodiment 95 wherein at least one IB in at least one of the one or more IBGs is a partial IB comprising less than M contiguous PRBs in the frequency domain.

Embodiment 97: The method of embodiment 96 wherein all remaining IBs of the at least one of the one or more IBGs and all IBs of all of the other IBGs from among the one or more IBGs are full IBs each consisting of M contiguous PRBs in the frequency domain.

Embodiment 98: The method of any one of embodiments 90 to 94 wherein each IB consists of at least M contiguous physical resource blocks, PRBs, in the frequency domain.

Embodiment 99: The method of embodiment 98 wherein at least one IB in at least one of the one or more IBGs is an extended IB comprising more than M contiguous PRBs in the frequency domain.

Embodiment 100: The method of embodiment 99 wherein all remaining IBs of the at least one of the one or more IBGs and all IBs of all of the other IBGs from among the one or more IBGs are full IBs each consisting of M contiguous PRBs in the frequency domain.

Embodiment 101: The method of any one of embodiments 89 to 100 wherein the interlace indicator indicates, from among the M interlaces, one or more interlaces that are allocated for the uplink transmission within the K IBs in at least one of (e.g., each of) the one or more IBGs.

Embodiment 102: The method of embodiment 101 wherein the interlace indicator comprises a bitmap wherein the m-th position in the bitmap indicates whether a respective interlace from among the M interlaces is allocated for the uplink transmission.

Embodiment 103: The method of embodiment 101 wherein the interlace indicator comprises an index to a table of predefined interlace index combinations.

Embodiment 104: The method of embodiment 101 wherein the interlace indicator comprises a list of interlace indices.

Embodiment 105: The method of any one of embodiments 89 to 104 wherein at least one of the one or more IBGs consists of a non-integer number of IBs but an integer number of PRBs.

Embodiment 106: The method of embodiment 105 wherein a particular IBG from among the one or more IBGs consists of a number of contiguous PRBs with a lowest PRB index i and a highest PRB index j, wherein j>i.

Embodiment 107: The method of embodiment 106 wherein the index i and the index j correspond to a particular sub-band of the bandwidth part or carrier in which LBT operation is performed.

Embodiment 108: The method of embodiment 107 further comprising receiving indications of the index i and the index j via higher layer signaling.

Embodiment 109: The method of any one of embodiments 87 to 108 wherein receiving (1100) the frequency domain interlace allocation for the transmission comprises receiving the interlace indicator via one or more of: dynamically via DCI signaling; dynamically via MAC CE signaling; and semi-statically via higher layer signaling (e.g., RRC signaling).

Embodiment 110: The method of any one of embodiments 1 to 23 wherein the transmission is one or more of: a PUSCH transmission; a PUCCH transmission; a SRS transmission; and a PRACH transmission.

Embodiment 111: The method of any one of embodiments 87 to 110 wherein the reserved resource pattern comprises a bitmap where the i-th position of the bitmap indicates whether a respective PRB is available or is not available.

Embodiment 112: The method of any one of embodiments 87 to 110 wherein the reserved resource pattern comprises a bitmap where the j-th position of the bitmap indicates whether all PRBs within a respective IB are available or are not available.

Embodiment 113: The method of any one of embodiments 87 to 110 wherein the reserved resource pattern comprises a bitmap where the j-th position of the bitmap indicates whether all PRBs within a respective IBG are available or are not available.

Embodiment 114: The method of any one of embodiments 87 to 110 wherein the reserved resource pattern comprises a list of PRB indices.

Embodiment 115: The method of any one of embodiments 87 to 110 wherein the reserved resource pattern comprises a list of IB indices.

Embodiment 116: The method of any one of embodiments 87 to 110 wherein the reserved resource pattern comprises a list of IBG indices.

Embodiment 117: The method of any one of embodiments 87 to 116 wherein receiving the reserved resource indicator comprises receiving the reserved resource indicator via: dynamic signaling (e.g., via DCI or via MAC CE), or semi-static signaling (e.g., via higher layer signaling such as, e.g., RRC signaling), or a combination of dynamic signaling and semi-static signaling.

Embodiment 118: The method of any one of embodiments 87 to 116 wherein receiving the reserved resource indicator comprises receiving the reserved resource indicator via DCI, the DCI being a DCI used for scheduling uplink resources (e.g., DCI 0_0 or 0_1).

Embodiment 118a: The method of embodiment 118, wherein the scheduled uplink resources are for one or more of: PUSCH transmission, PUCCH transmission, and SRS transmission.

Embodiment 118b: The method of any one of embodiments 87 to 116 wherein receiving the reserved resource indicator comprises receiving the reserved resource indicator via semi-static signaling (e.g., via higher layer signaling such as, e.g., RRC signaling) and the uplink transmission is not scheduled by DCI.

Embodiment 118c: The method of embodiment 118b wherein the uplink transmission not scheduled by DCI is one or more of: a configured grant PUSCH transmission, a PUCCH transmission, and an SRS transmission.

Embodiment 119: The method of any of the previous embodiments, further comprising: providing user data; and forwarding the user data to a host computer via the transmission to the base station.

Group E

Embodiment 120: A method performed by a base station, the method comprising: transmitting, to a wireless device, a reserved resource indicator that refers to a plurality of pre-configured uplink reserved resource patterns each indicating at least which subset of uplink Physical Resource Blocks, PRBs, from among a set of allocated uplink PRBs are not available or are available for uplink transmission.

Embodiment 121: The method of embodiment 120 further comprising: transmitting (1100), to the wireless device, a frequency domain interlace allocation for the uplink transmission, the frequency domain interlace allocation comprising an interlace indicator that indicates the set of allocated uplink PRBs.

Embodiment 122: The method of embodiment 121 wherein: M interlaces (where M>1) are defined for a bandwidth part or carrier on which the uplink transmission is allocated; and the bandwidth part or carrier bandwidth on which the uplink transmission is allocated is (e.g., logically) divided, in the frequency domain, into one or more Interlace Block Groups (IBGs).

Embodiment 123: The method of embodiment 122 wherein each IBG consists of K IBs.

Embodiment 124: The method of embodiment 122 wherein each IBG consists of up to K IBs.

Embodiment 125: The method of embodiment 122 wherein the one or more IBGs comprise one or more full IBGs each consisting of K IBs and a partial IBG consisting of at least one PRB.

Embodiment 126: The method of embodiment 122 wherein each IBG consists of at least K IBs.

Embodiment 127: The method of embodiment 126 wherein the one or more IBGs comprise one or more full IBGs each consisting of K IBs and an extended IBG consisting of more than M PRBs.

Embodiment 128: The method of any one of embodiments 123 to 127 wherein each IB consists of up to M contiguous physical resource blocks, PRBs, in the frequency domain.

Embodiment 129: The method of embodiment 128 wherein at least one IB in at least one of the one or more IBGs is a partial IB comprising less than M contiguous PRBs in the frequency domain.

Embodiment 130: The method of embodiment 129 wherein all remaining IBs of the at least one of the one or more IBGs and all IBs of all of the other IBGs from among the one or more IBGs are full IBs each consisting of M contiguous PRBs in the frequency domain.

Embodiment 131: The method of any one of embodiments 123 to 127 wherein each IB consists of at least M contiguous physical resource blocks, PRBs, in the frequency domain.

Embodiment 132: The method of embodiment 131 wherein at least one IB in at least one of the one or more IBGs is an extended IB comprising more than M contiguous PRBs in the frequency domain.

Embodiment 133: The method of embodiment 132 wherein all remaining IBs of the at least one of the one or more IBGs and all IBs of all of the other IBGs from among the one or more IBGs are full IBs each consisting of M contiguous PRBs in the frequency domain.

Embodiment 134: The method of any one of embodiments 122 to 133 wherein the interlace indicator indicates, from among the M interlaces, one or more interlaces f that are allocated for the uplink transmission within the K IBs in at least one of (e.g., each of) the one or more IBGs.

Embodiment 135: The method of embodiment 134 wherein the interlace indicator comprises a bitmap wherein the m-th position in the bitmap indicates whether a respective interlace from among the M interlaces is allocated for the uplink transmission.

Embodiment 136: The method of embodiment 134 wherein the interlace indicator comprises an index to a table of predefined interlace index combinations.

Embodiment 137: The method of embodiment 134 wherein the interlace indicator comprises a list of interlace indices.

Embodiment 138: The method of any one of embodiments 134 to 137 wherein at least one of the one or more IBGs consists of a non-integer number of IBs but an integer number of PRBs.

Embodiment 139: The method of embodiment 138 wherein a particular IBG from among the one or more IBGs consists of a number of contiguous PRBs with a lowest PRB index i and a highest PRB index j, wherein j>i.

Embodiment 140: The method of embodiment 139 wherein the index i and the index j correspond to a particular sub-band of the bandwidth part or carrier in which LBT operation is performed.

Embodiment 141: The method of embodiment 140 further comprising receiving indications of the index i and the index j via higher layer signaling.

Embodiment 142: The method of any one of embodiments 120 to 141 wherein transmitting (1100) the frequency domain interlace allocation for the transmission comprises transmitting the IBG indicator and the interlace indicator via one or more of: dynamically via DCI signaling; dynamically via MAC CE signaling; and semi-statically via higher layer signaling (e.g., RRC signaling).

Embodiment 143: The method of any one of embodiments 120 to 142 wherein the transmission is one or more of: a PDSCH transmission; a PUCCH transmission; a SRS transmission; and a PRACH transmission.

Embodiment 144: The method of any one of embodiments 120 to 143 wherein the reserved resource pattern comprises a bitmap where the i-th position of the bitmap indicates whether a respective PRB is available or is not available.

Embodiment 145: The method of any one of embodiments 120 to 143 wherein the reserved resource pattern comprises a bitmap where the j-th position of the bitmap indicates whether all PRBs within a respective IB are available or are not available.

Embodiment 146: The method of any one of embodiments 120 to 143 wherein the reserved resource pattern comprises a bitmap where the j-th position of the bitmap indicates whether all PRBs within a respective IBG are available or are not available.

Embodiment 147: The method of any one of embodiments 120 to 143 wherein the reserved resource pattern comprises a list of PRB indices.

Embodiment 148: The method of any one of embodiments 120 to 143 wherein the reserved resource pattern comprises a list of IB indices.

Embodiment 149: The method of any one of embodiments 120 to 143 wherein the reserved resource pattern comprises a list of IBG indices.

Embodiment 150: The method of any one of embodiments 120 to 149 wherein transmitting the reserved resource indicator comprising signaling the reserved resource indicator to the wireless: dynamically (e.g., via DCI or via MAC CE), or semi-statically (e.g., via higher layer signaling such as, e.g., RRC signaling), or a combination of dynamic signaling and semi-static signaling.

Embodiment 151: The method of any one of embodiments 120 to 149 wherein transmitting the reserved resource indicator comprising signaling the reserved resource indicator to the wireless via DCI, the DCI being a DCI used for scheduling uplink resources (e.g., DCI 0_0 or 0_1).

Embodiment 151a: The method of embodiment 151, wherein the scheduled uplink resources are for one or more of: PUSCH transmission, PUCCH transmission, and SRS transmission.

Embodiment 151b: The method of any one of embodiments 120 to 149 wherein transmitting the reserved resource indicator comprises transmitting the reserved resource indicator via semi-static signaling (e.g., via higher layer signaling such as, e.g., RRC signaling) and the uplink transmission is not scheduled by DCI.

Embodiment 151c: The method of claim 151b wherein the uplink transmission not scheduled by DCI is one or more of: a configured grant PUSCH transmission, a PUCCH transmission, and an SRS transmission.

Embodiment 152: The method of any of the previous embodiments, further comprising: obtaining user data; and forwarding the user data to a host computer or a wireless device.

Group F

Embodiment 153: A wireless device comprising: processing circuitry configured to perform any of the steps of any of the Group D embodiments; and power supply circuitry configured to supply power to the wireless device.

Embodiment 154: A base station comprising: processing circuitry configured to perform any of the steps of any of the Group E embodiments; and power supply circuitry configured to supply power to the base station.

Embodiment 155: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group D embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 156: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group E embodiments.

Embodiment 157: The communication system of the previous embodiment further including the base station.

Embodiment 158: The communication system of the previous 2 embodiments, further including the UE, wherein the UE is configured to communicate with the base station.

Embodiment 159: The communication system of the previous 3 embodiments, wherein: the processing circuitry of the host computer is configured to execute a host application, thereby providing the user data; and the UE comprises processing circuitry configured to execute a client application associated with the host application.

Embodiment 160: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group E embodiments.

Embodiment 161: The method of the previous embodiment, further comprising, at the base station, transmitting the user data.

Embodiment 162: The method of the previous 2 embodiments, wherein the user data is provided at the host computer by executing a host application, the method further comprising, at the UE, executing a client application associated with the host application.

Embodiment 163: A User Equipment, UE, configured to communicate with a base station, the UE comprising a radio interface and processing circuitry configured to perform the method of the previous 3 embodiments.

Embodiment 164: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group D embodiments.

Embodiment 165: The communication system of the previous embodiment, wherein the cellular network further includes a base station configured to communicate with the UE.

Embodiment 166: The communication system of the previous 2 embodiments, wherein: the processing circuitry of the host computer is configured to execute a host application, thereby providing the user data; and the UE's processing circuitry is configured to execute a client application associated with the host application.

Embodiment 167: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group D embodiments.

Embodiment 168: The method of the previous embodiment, further comprising at the UE, receiving the user data from the base station.

Embodiment 169: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group D embodiments.

Embodiment 170: The communication system of the previous embodiment, further including the UE.

Embodiment 171: The communication system of the previous 2 embodiments, further including the base station, wherein the base station comprises a radio interface configured to communicate with the UE and a communication interface configured to forward to the host computer the user data carried by a transmission from the UE to the base station.

Embodiment 172: The communication system of the previous 3 embodiments, wherein: the processing circuitry of the host computer is configured to execute a host application; and the UE's processing circuitry is configured to execute a client application associated with the host application, thereby providing the user data.

Embodiment 173: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 174: A method implemented in a communication system including a host computer, a base station, and a User Equipment, UE, the method comprising: at the host computer, receiving user data transmitted to the base station from the UE, wherein the UE performs any of the steps of any of the Group D embodiments.

Embodiment 175: The method of the previous embodiment, further comprising, at the UE, providing the user data to the base station.

Embodiment 176: The method of the previous 2 embodiments, further comprising: at the UE, executing a client application, thereby providing the user data to be transmitted; and at the host computer, executing a host application associated with the client application.

Embodiment 177: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 178: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group E embodiments.

Embodiment 179: The communication system of the previous embodiment further including the base station.

Embodiment 180: The communication system of the previous 2 embodiments, further including the UE, wherein the UE is configured to communicate with the base station.

Embodiment 181: The communication system of the previous 3 embodiments, wherein: the processing circuitry of the host computer is configured to execute a host application; and the UE is configured to execute a client application associated with the host application, thereby providing the user data to be received by the host computer.

Embodiment 182: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group D embodiments.

Embodiment 183: The method of the previous embodiment, further comprising at the base station, receiving the user data from the UE.

Embodiment 184: The method of the previous 2 embodiments, further comprising at the base station, initiating a transmission of the received user data to the host computer.

5 Abbreviations

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
5GC Fifth Generation Core
5GS Fifth Generation System
ACK Acknowledgement
AMF Access and Mobility Function
AP Access Point
ASIC Application Specific Integrated Circuit
AUSF Authentication Server Function
BI-FDMA Block Interleaved Frequency Division Multiple Access
BWP Bandwidth Part
CA Carrier Aggregation
CACLR Cumulative Adjacent Channel Leakage Ratio
CC Component Carrier
CDF Cumulative Distribution Function
CE Control Element
CG Configured Grant
CM Cubic Metric
COT Channel Occupancy Time
CPU Central Processing Unit
CSI-RS Channel State Information Reference Signal
D2D Device-to-Device
dB Decibel
dBm Decibel-Milliwatt
DCI Downlink Control Information
DL Downlink
DSP Digital Signal Processor
EIRP Equivalent Isotropic Radiated Power
eLAA Enhanced License Assisted Access
eNB Enhanced or Evolved Node B
ETSI European Telecommunications Standards Institute
FDMA Frequency Division Multiple Access
FFS For Further Study
FPGA Field Programmable Gate Array
GHz Gigahertz
gNB New Radio Base Station
HARQ Hybrid Automatic Repeat Request
HSS Home Subscriber Server
IB Interlace Block
IBG Interlace Block Group
IE Information Element
kHz Kilohertz
LBT Listen-Before-Talk
LTE Long Term Evolution
MAC Medium Access Control
MCL Minimum Coupling Loss
MHz Megahertz
MME Mobility Management Entity
MSB Most Significant Bit
Msg Message
MTC Machine Type Communication
NACK Negative Acknowledgement
NEF Network Exposure Function
NF Network Function
NR New Radio
NRF Network Function Repository Function
NR-U New Radio in Unlicensed Spectrum
ns Nanosecond
NSSF Network Slice Selection Function
OCB Occupied Channel Bandwidth
OCC Orthogonal Cover Code
OFDM Orthogonal Frequency Division Multiplexing
OTT Over-the-Top
PAPR Peak-to-Average Power Ratio
PCell Primary Cell
PCF Policy Control Function
P-GW Packet Data Network Gateway
PRACH Physical Random Access Channel
PRB Physical Resource Block
PSD Power Spectral Density
PUCCH Physical Uplink Control Channel
PUSCH Physical Uplink Shared Channel
RA Resource Allocation
RAM Random Access Memory
RAN Radio Access Network
RAR Random Access Response
RAT Radio Access Technology
RB Resource Block
RBG Resource Block Group
Rel Release
RF Radio Frequency
RIV Resource Indicator Value
ROM Read Only Memory
RRC Radio Resource Control
RRH Remote Radio Head
SCEF Service Capability Exposure Function
SCell Secondary Cell
SCH Shared Channel
SCS Subcarrier Spacing
SIB System Information Block
SMF Session Management Function
SRS Sounding Reference Signal
TDD Time Division Duplexing
TR Technical Report
TS Technical Specification
UDM Unified Data Management
UE User Equipment
UL Uplink
ULLCC Ultra-Low Latency Critical Communications
UPF User Plane Function
WID Work Item Description
ZC Zadoff-Chu Those skilled in the art will recognize improvements and modifications to the embodiments of the present disclosure. All such improvements and modifications are considered within the scope of the concepts disclosed herein.

What is claimed is:

1. A method performed by a wireless device, the method comprising:
receiving a reserved resource indicator that indicates an uplink reserved resource pattern, wherein the uplink reserved resource pattern defines at least which subset of uplink Physical Resource Blocks, PRBs, from among a set of allocated uplink PRBs are not available for uplink transmission; and
receiving a frequency domain interlace allocation for the uplink transmission, wherein the frequency domain interlace allocation comprises an interlace indicator that indicates the set of allocated uplink PRBs;
wherein the reserved resource indicator indicates resources from among a nominal PRB assignment are not available for uplink transmission;
M interlaces are defined for a bandwidth part or carrier bandwidth on which the uplink transmission is allocated, where M>1; and
the bandwidth part or carrier bandwidth on which the uplink transmission is allocated is divided, in the frequency domain, into one or more Interlace Block Groups, IBGs.

2. The method of claim 1 further comprising transmitting an uplink transmission to at least a subset of the set of allocated uplink PRBs in accordance with the reserved resource indicator.

3. The method of claim 1 wherein: the frequency domain interlace allocation further comprises an IBG indicator that indicates, from among the one or more IBGs of the bandwidth part or carrier bandwidth, at least one IBG in which the set of allocated uplink PRBs are allocated for the uplink transmission; and
the interlace indicator indicates which interlaces within the at least one IBG indicated by the IBG indicator are allocated for the uplink transmission.

4. The method of claim 1 wherein each IBG consists of up to K Interlace Blocks, IBs, where K is an integer value that is greater than or equal to 1.

5. The method of claim 1 wherein each IBG consists of at least K Interlace Blocks, IBs, where K is an integer value that is greater than or equal to 1.

6. The method of claim 4 wherein each IB consists of up to M contiguous PRBs in the frequency domain.

7. The method of claim 4 wherein each IB consists of at least M contiguous PRBs in the frequency domain.

8. The method of claim 4 wherein the interlace indicator indicates, from among the M interlaces, one or more interlaces that are allocated for the uplink transmission within the K IBs in at least one of the one or more IBGs.

9. The method of claim 1 wherein receiving the frequency domain interlace allocation for the transmission comprises receiving the interlace indicator via: a. Downlink Control Information, DCI, signaling; b. Medium Access Control, MAC, Control Element, CE, signaling; c. higher layer signaling, or d. a combination of any two or more of (a)-(c).

10. The method of claim 1 wherein the uplink transmission is one or more of: a Physical Uplink Shared Channel, PUSCH, transmission; a Physical Uplink Control Channel, PUCCH, transmission; a Sounding Reference Signal, SRS, transmission; and a Physical Random Access Channel, PRACH, transmission.

11. The method of claim 1 wherein receiving the reserved resource indicator comprises receiving the reserved resource indicator via: dynamic signaling, or semi-static signaling, or a combination of dynamic signaling and semi-static signaling.

12. The method of claim 1 wherein receiving the reserved resource indicator comprises receiving the reserved resource indicator via DCI, where the DCI is a DCI used for scheduling uplink resources.

13. The method of claim 12, wherein the scheduled uplink resources are for: a. a PUSCH transmission, b. a PUCCH transmission, c. a SRS transmission, or d. a combination of any two or more of (a)-(c).

14. The method of claim 1 wherein receiving the reserved resource indicator comprises receiving the reserved resource indicator via semi-static signaling and the uplink transmission is not scheduled by DCI.

15. A method performed by a base station, the method comprising:
transmitting to a wireless device, a reserved resource indicator that indicates an uplink reserved resource pattern, wherein the uplink reserved resource pattern defines at least which subset of uplink Physical Resource Blocks, PRBs, from among a set of allocated uplink PRBs are not available for uplink transmission; and
transmitting a frequency domain interlace allocation for the uplink transmission, wherein the frequency domain interlace allocation comprises an interlace indicator that indicates the set of allocated uplink PRBs;
wherein the reserved resource indicator indicates resources from among a nominal PRB assignment are not available for uplink transmission;
M interlaces are defined for a bandwidth part or carrier bandwidth on which the uplink transmission is allocated, where M>1; and
the bandwidth part or carrier bandwidth on which the uplink transmission is allocated is divided, in the frequency domain, into one or more Interlace Block Groups, IBGs.

16. A wireless device comprising: one or more transmitters; one or more receivers; and processing circuitry associated with the one or more transmitters and the one or more receivers, the processing circuitry configured to cause the wireless device to:
receive a reserved resource indicator that indicates an uplink reserved resource pattern, wherein the uplink reserved resource pattern defines at least which subset of uplink Physical Resource Blocks, PRBs, from among a set of allocated uplink PRBs are not available for uplink transmission; and
receive a frequency domain interlace allocation for the uplink transmission, wherein the frequency domain interlace allocation comprises an interlace indicator that indicates the set of allocated uplink PRBs;
wherein the reserved resource indicator indicates resources from among a nominal PRB assignment are not available for uplink transmission;
M interlaces are defined for a bandwidth part or carrier bandwidth on which the uplink transmission is allocated, where M>1; and
the bandwidth part or carrier bandwidth on which the uplink transmission is allocated is divided, in the frequency domain, into one or more Interlace Block Groups, IBGs.

17. The wireless device of claim 16 wherein the processing circuitry is further configured to cause the wireless device to transmit an uplink transmission to at least a subset of the set of allocated uplink PRBs in accordance with the reserved resource indicator.

* * * * *